(12) United States Patent
Bookbinder et al.

(10) Patent No.: US 11,420,293 B2
(45) Date of Patent: *Aug. 23, 2022

(54) METHODS OF FERRULE RESHAPING FOR CORRECTING CORE-TO-FERRULE CONCENTRICITY ERRORS, AND OPTICAL FIBER CABLE ASSEMBLIES RELATED TO SUCH METHODS

(71) Applicant: CORNING OPTICAL COMMUNICATIONS LLC, Hickory, NC (US)

(72) Inventors: Dana Craig Bookbinder, Corning, NY (US); Boyang Lin, Hickory, NC (US); Garrett Andrew Piech, Corning, NY (US); Steven Ross Sims, Denton, TX (US); James Scott Sutherland, Corning, NY (US); Michael Brian Webb, Lindley, NY (US); Elvis Alberto Zambrano, Wilmington, NC (US)

(73) Assignee: Corning Optical Communications LLC, Charlotte, NC (US)

(*) Notice: Subject to any disclaimer, the term of this patent is extended or adjusted under 35 U.S.C. 154(b) by 174 days.

This patent is subject to a terminal disclaimer.

(21) Appl. No.: 16/459,041

(22) Filed: Jul. 1, 2019

(65) Prior Publication Data

US 2019/0321922 A1 Oct. 24, 2019

Related U.S. Application Data

(63) Continuation-in-part of application No. 15/602,468, filed on May 23, 2017, now Pat. No. 10,336,644.
(Continued)

(51) Int. Cl.
*B23K 26/384* (2014.01)
*G02B 6/38* (2006.01)
(Continued)

(52) U.S. Cl.
CPC ........ *B23K 26/384* (2015.10); *B23K 26/0006* (2013.01); *B23K 26/362* (2013.01); *G02B 6/3863* (2013.01)

(58) Field of Classification Search
None
See application file for complete search history.

(56) References Cited

U.S. PATENT DOCUMENTS

| 4,146,300 A | 3/1979 | Kaiser |
| 4,205,896 A | 6/1980 | Borsuk |

(Continued)

FOREIGN PATENT DOCUMENTS

| CN | 201979258 U | 9/2011 |
| CN | 102699781 A | 10/2012 |

(Continued)

OTHER PUBLICATIONS

Houghton Mifflin Harcourt, "Ellipse", https://www.cliffsnotes.com/study-guides/algebra/algebra-ii/conic-sections/ellipse, 7 pages, per Wayback Machine, Aug. 2015 (Year: 2015).*

(Continued)

*Primary Examiner* — Lisa L Herring

(57) ABSTRACT

Methods of reshaping ferrules used in optical fiber cables assemblies are disclosed. The reshaping methods reduce a core-to-ferrule concentricity error (E), which improves coupling efficiency and optical transmission. The methods include measuring a true center of the ferrule, wherein the true center is based on an outer surface of the ferrule; and reshaping at least a portion of the ferrule to change the true center of the ferrule, wherein the reshaping includes enlarging a portion of the ferrule. A variety of reshaping techniques are also disclosed.

15 Claims, 18 Drawing Sheets

Related U.S. Application Data

(60) Provisional application No. 62/341,852, filed on May 26, 2016.

(51) Int. Cl.
*B23K 26/362* (2014.01)
*B23K 26/00* (2014.01)

(56) References Cited

U.S. PATENT DOCUMENTS

| | | |
|---|---|---|
| 4,721,357 A | 1/1988 | Kovalchick et al. |
| 4,763,980 A | 8/1988 | Gerber et al. |
| 4,880,291 A | 11/1989 | Aberson, Jr. et al. |
| 5,216,734 A | 6/1993 | Grinderslev |
| 5,278,928 A | 1/1994 | Ueda et al. |
| RE37,079 E | 3/2001 | Stephenson et al. |
| 6,470,120 B2 | 10/2002 | Green et al. |
| 6,629,782 B2 | 10/2003 | McPhee et al. |
| 6,655,851 B1 | 12/2003 | Lee |
| 6,663,293 B2 | 12/2003 | Lampert et al. |
| 6,715,932 B2 | 4/2004 | Kuroha et al. |
| 6,742,936 B1 | 6/2004 | Knecht et al. |
| 6,935,791 B2 | 8/2005 | Ban et al. |
| 7,209,375 B2 | 4/2007 | Gimbel et al. |
| 7,322,751 B2 | 1/2008 | Hurt |
| 7,480,432 B2 | 1/2009 | Grzybowski et al. |
| 7,724,992 B2 | 5/2010 | Sutherland |
| 7,792,404 B2 | 9/2010 | Streltsov et al. |
| 8,291,729 B2 | 10/2012 | Grzybowski et al. |
| 8,397,537 B2 | 3/2013 | Grzybowski et al. |
| 8,702,322 B1 | 4/2014 | Danley et al. |
| 9,128,254 B2 | 9/2015 | Danley et al. |
| 9,588,303 B2 | 3/2017 | Danley et al. |
| 9,612,177 B2 | 4/2017 | Clarke et al. |
| 2002/0172469 A1 | 11/2002 | Benner et al. |
| 2003/0070257 A1 | 4/2003 | Takahashi et al. |
| 2003/0095753 A1 | 5/2003 | Wada et al. |
| 2003/0235373 A1 | 12/2003 | Ishii et al. |
| 2007/0041686 A1* | 2/2007 | Wada .................. G02B 6/3874 385/92 |
| 2010/0272397 A1 | 10/2010 | Komaki et al. |
| 2010/0301502 A1 | 12/2010 | Ott et al. |
| 2015/0177097 A1 | 6/2015 | Clarke et al. |
| 2015/0338574 A1 | 11/2015 | Pelletier |
| 2016/0033325 A1 | 2/2016 | Fusco et al. |
| 2016/0061690 A1 | 3/2016 | Elkins, II et al. |
| 2016/0131850 A1 | 5/2016 | Kondo et al. |

FOREIGN PATENT DOCUMENTS

| | | |
|---|---|---|
| CN | 202742191 U | 2/2013 |
| EP | 0574015 A2 | 12/1993 |
| JP | 10221568 A | 8/1998 |
| JP | 2002146583 A | 5/2002 |
| JP | 2002212772 A | 7/2002 |
| JP | 2003175444 A | 6/2003 |
| JP | 2003248137 A | 9/2003 |
| JP | 2005283300 A | 10/2005 |
| JP | 4326309 B2 | 9/2009 |

OTHER PUBLICATIONS

International Search Report and Written Opinion PCT/US2017/034432 dated Aug. 29, 2017.

* cited by examiner

METHODS OF FERRULE RESHAPING FOR CORRECTING CORE-TO-FERRULE CONCENTRICITY ERRORS, AND OPTICAL FIBER CABLE ASSEMBLIES RELATED TO SUCH METHODS

CROSS-REFERENCE TO RELATED APPLICATIONS

This application is a continuation-in-part application that claims the benefit of priority of U.S. patent application Ser. No. 15/602,468, filed on May 23, 2017, which claims the benefit of priority under 35 U.S.C § 119 of U.S. Provisional Application No. 62/341,852, filed on May 26, 2016. The content of these applications is relied upon and incorporated herein by reference in its entirety.

FIELD

The present disclosure relates to optical fiber cable assemblies, and in particular relates to methods of ferrule reshaping for correcting core-to-ferrule concentricity errors for ferrules used in optical fiber connectors.

BACKGROUND

Optical fiber connectors ("connectors") are devices used to optically connect one optical fiber to another, or to connect an optical fiber to another device such as an optical transmitter or an optical receiver. An optical fiber cable typically carries the optical fiber, which has relatively high-index core section in which most of the light is carried, and a surrounding relatively low-index cladding section that surrounds the core. A ferrule in the connector supports a bare end section of the optical fiber. The bare end section has a polished end face that coincides with a planar front face of the ferrule. The connector and the optical fiber cable constitute a cable assembly.

An important property of a connector is its ability to provide an efficient optical connection with the optical fiber of another connector, i.e., an optical connection whereby the optical loss (also called "insertion loss") from the light passing out of one fiber end face and into the other fiber end face is minimal. This efficiency is referred to in the art as the "coupling efficiency." A misalignment of the end faces of the two optical fibers supported by the two connectors is one of the main sources of insertion loss. Since most of the light traveling in an optical fiber is confined to the core, the couple efficiency between two connectors depends in large measure on the amount of offset between the cores. This offset can be due to a core-to-ferrule error, i.e., an offset between the location of the core of the optical fiber and the true center of the ferrule.

Ideally, the cores of the optical fibers supported by respective connectors are perfectly axially aligned to maximize the coupling efficiency. In practice, however, there is almost always some amount of core-to-ferrule eccentricity error. It would be advantageous therefore to reduce the core-to-ferrule eccentricity error on a ferrule-by-ferrule basis to improve the coupling efficiency of connectors.

SUMMARY

An embodiment of the disclosure includes a method for reducing a core-to-ferrule concentricity error for a ferrule having an axial bore sized to operably support an optical fiber having a core. The method includes: measuring a true center of the ferrule, wherein the true center is based on an outer surface of the ferrule; and reshaping at least a portion of the ferrule to change the true center of the ferrule, wherein the reshaping includes enlarging a portion of the ferrule.

In another embodiment of the present disclosure, the step of enlarging a portion of the ferrule includes forming one or more protuberances on the outer surface of the ferrule. In another embodiment, the step of forming one or more protuberances on the outer surface of the ferrule comprises: creating, on the outer surface of the ferrule, a crater with at least one micro-protuberance on the side of the crater. In another embodiment, a depth of the crater is between 0.1 µm and 1000 µm and a height of the at least one micro-protuberance is between 0.02 µm and 100 µm. In another embodiment, creating the crater and the at least one micro-protuberance includes applying a laser beam to irradiate the outer surface of the ferrule, wherein the laser beam has a wavelength ranging between 10 nm and 20,000 nm and an average power delivered to the ferrule between 0.001 µJ/µm$^2$ and 1000 µJ/µm$^2$, wherein the average power is based on a time period that is between 1 pico-second and 1 second.

In yet another embodiment, the laser beam has a wavelength between 100 nm and 2000 nm and an average power delivered to the ferrule between 0.01 µJ/µm$^2$ and 100 µJ/µm$^2$, wherein the average power is based on a time period that is between 1 pico-second and 1 second. In another embodiment, the laser beam has a wavelength between 150 nm and 1000 nm and an average power delivered to the ferrule between 0.01 µJ/µm$^2$ and 100 µJ/µm$^2$, wherein the average power is based on a time period that is between 1 pico-second and 1 second. In another embodiment, the laser beam has a wavelength between 150 nm and 1000 nm and an average power delivered to the ferrule between 0.01 µJ/µm$^2$ and 10 µJ/µm$^2$, wherein the average power is based on a time period that is between 1 pico-second and 1 second. In another embodiment, wherein the laser beam has a wavelength between 355 nm and 532 nm and an average power delivered to the ferrule between 0.1 µJ/µm$^2$ and 10 µJ/µm$^2$, wherein the average power is based on a time period that is between 1 pico-second and 1 second.

In yet another embodiment, the method further includes mating a sleeve having a sleeve center onto the ferrule, wherein the at least one micro-protuberance engages with the sleeve thereby distributing a force of the sleeve when applied onto the ferrule. In another embodiment, the at least one micro-protuberance engages with the sleeve to reduce an eccentricity of the core relative to the sleeve center. In another embodiment, the step of reshaping includes removing material from the at least one micro-protuberance, wherein the step of removing material includes polishing the at least one micro-protuberance.

In yet another embodiment, the at least one micro-protuberance includes a first micro-protuberance on one side of the crater and a second micro-protuberance on a second side of the crater; wherein a depth of the crater is between 0.1 µm and 1000 µm and heights of the first micro-protuberance and the second micro-protuberance are between 0.02 µm and 100 µm. In another embodiment, the first micro-protuberance and the second micro-protuberance are positioned opposite each other defining the crater therebetween. In another embodiment, the at least one micro-protuberance includes a cluster of micro-protuberances around the crater; wherein a depth of the crater is between 0.1 µm and 1000 µm and a maximum height of the cluster of micro-protuberances is between 0.02 µm and 100 µm. In another embodiment, enlarging a portion of the ferrule includes increasing a diameter of the ferrule to a predetermined value.

Another embodiment of the disclosure includes a method of reducing misalignment between a first ferrule and a second ferrule. The method includes: measuring a first diameter of the first ferrule and a second diameter of the second ferrule, wherein the first diameter is larger than the second diameter; reshaping at least a portion of the second ferrule to increase the second diameter of the second ferrule and reduce the difference between the first diameter and the second diameter; wherein reshaping at least a portion of the second ferrule includes enlarging a portion of the second ferrule. In another embodiment, the step of enlarging a portion of the second ferrule includes forming one or more protuberances on an outer surface of the second ferrule. In another embodiment, the step of forming one or more protuberances on the outer surface of the second ferrule comprises: creating, on the outer surface of the second ferrule, a crater with at least one micro-protuberance on the side of the crater such that the at least one micro-protuberance increases the second diameter of the second ferrule to reduce the difference between the first diameter and the second diameter. In another embodiment, the reshaping step includes enlarging a portion of the first ferrule. In another embodiment, the step of enlarging a portion of the first ferrule includes forming one or more protuberances on an outer surface of the first ferrule. In another embodiment, the step of forming one or more protuberances on the outer surface of the first ferrule comprises: creating, on the outer surface of the first ferrule, a crater with at least one micro-protuberance on the side of the crater such that the at least one micro-protuberance increases the first diameter of the first ferrule.

In another embodiment of the disclosure, the step of reshaping includes irradiating one or more locations on the outer surface of the second ferrule with a laser beam, wherein the laser beam has a wavelength ranging between 10 nm and 2000 nm and an average power delivered to the second ferrule between 0.001 µJ/µm² and 1000 µJ/µm², wherein the average power is based on a time period that is between 1 pico-second and 1 second. In another embodiment, a depth of the crater is between 0.1 µm and 1000 µm and a height of the at least one micro-protuberance is between 0.02 µm and 100 µm. In another embodiment, the at least one micro-protuberance includes a first micro-protuberance on a first side of the crater and a second micro-protuberance on a second side of the crater; wherein the first micro-protuberance and the second micro-protuberance are positioned opposite each other defining the crater therebetween. In another embodiment, a depth of the crater is between 0.1 µm and 1000 µm and heights of the first micro-protuberance and the second micro-protuberance are between 0.02 µm and 100 µm.

In yet another embodiment, the sleeve engages with the at least one micro-protuberance of the second ferrule. In another embodiment, the second diameter of the second ferrule is increased such that an offset between the first core and the second core within the sleeve is between 0 µm and 3 µm. In another embodiment, the at least one micro-protuberance engages with the sleeve such that the at least one micro-protuberance distributes a force applied by the sleeve.

Another embodiment of the disclosure includes a method of reducing misalignment between a first ferrule having a first axial bore sized to operably support a first optical fiber having a first core and a second ferrule having a second axial bore sized to operably support a second optical fiber having a second core. The method includes: measuring a first diameter of the first ferrule and a second diameter of the second ferrule, wherein the first diameter is larger than the second diameter and the core of each ferrule is off-centered; reshaping at least a portion of the first ferrule to increase the diameter of the first ferrule and center the first core of the first fiber relative to the first ferrule; reshaping at least a portion of the second ferrule to increase the second diameter of the second ferrule and reduce the difference between the first diameter and the second increased diameter and center the second core of the second fiber relative to the second ferrule; wherein reshaping at least a portion of the first ferrule and reshaping at least a portion of the second ferrule includes: creating, on an outer surface of both ferrules, a crater with at least one micro-protuberance on a side of the crater such that the at least one micro-protuberance increases the diameters of both ferrules to reduce the difference between the first diameter and the second diameter and to bring the first and second cores in each of the first and second ferrules closer to the respective ferrule centers, thereby improving alignment between the first core and the second core and improving an optical coupling between the first ferrule and the second ferrule within a sleeve.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

In the discussion below, the term "cylindrical" is not limited to body having a strictly circular cross-sectional shape and can include other cross-sectional shapes.

Also in the discussion below, the term "core-ferrule concentricity" can also be referred to as the "coaxiality," and the concentricity error can be referred to as a "coaxial error" or the "coaxiality error."

And in this disclosure, any ranges of values includes the stated end points of the range. For example, a range that is stated as being between A and B, or from A to B, with A and B being numerical values, includes both A and B in the stated range.

Optical Fiber Connector Sub-Assembly

Figure 1:
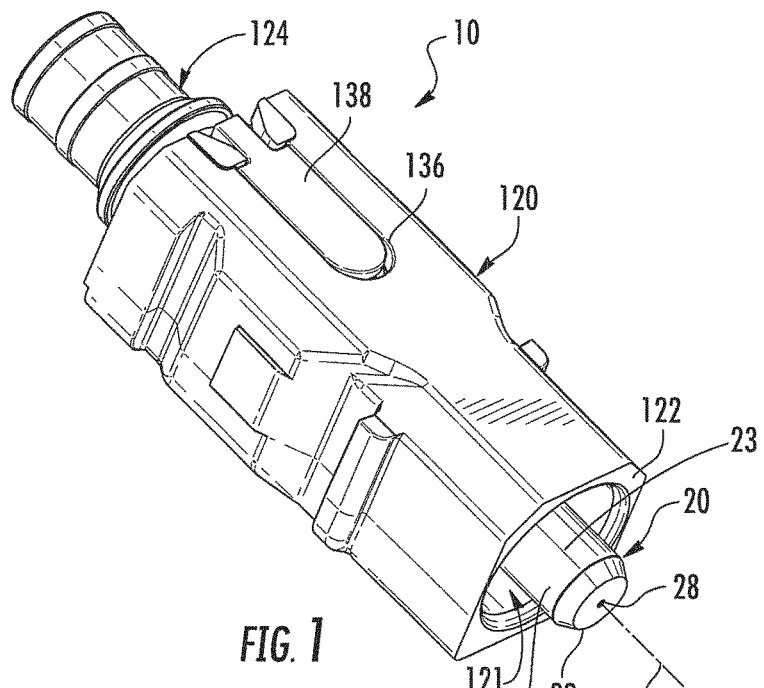
FIG. 1 is a perspective view of an example connector sub-assembly.
Figure 2:
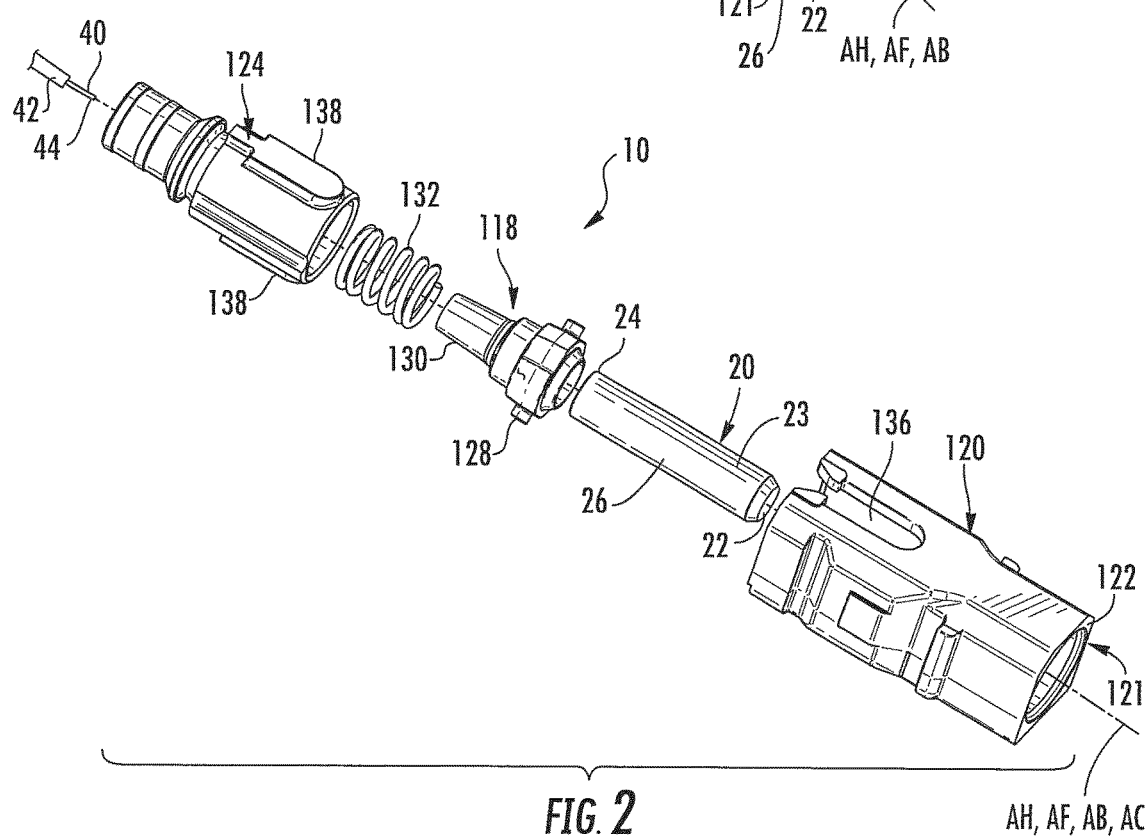
FIG. 2 is an exploded perspective view of the connector sub-assembly of FIG. 1.

FIG. 1 is a perspective view and FIG. 2 is an exploded perspective view of an example connector sub-assembly 10. The connector sub-assembly 10 includes a ferrule 20 having a front end 22 and back end 24. The ferrule 20 is configured to operably support a bare fiber section 40 (FIG. 5A) of an optical fiber 42, as discussed in greater detail below. The connector sub-assembly 10 includes a ferrule holder 118 from which the ferrule 20 extends. The connector sub-assembly 10 also includes a housing 120 having a cavity 121 and a front end 122. The housing 120 is referred to hereinafter as an "inner housing" 120 since it engages an outer housing, as explained below in connection with FIG. 4. The ferrule holder 118 is received within cavity 121 of inner housing 120.

The connector sub-assembly 10 also includes a connector body 124 (also referred to as "retention body 124", or "crimp body 124") configured to retain ferrule holder 118 within cavity 121 of inner housing 120. More specifically, back end 24 of ferrule 20 is received in a front-end portion 128 of ferrule holder 118 and secured therein in a known manner (e.g., press-fit, adhesive, molding the ferrule holder 118 over the back end 24 of the ferrule 20, etc.). The ferrule 20 and ferrule holder 118 may even be a monolithic structure in some embodiments. For convenience, the term "ferrule assembly" may be used to refer to the combination of the ferrule 20 and ferrule holder 118, regardless of whether these elements are separate components secured together or different portions of a monolithic structure.

The ferrule holder 118 is biased to a forward position within the housing 120 by a spring 132, which extends over a back-end portion 130 of ferrule holder 118. The back-end portion 130 has a reduced cross-sectional diameter/width compared to the front-end portion 128. The spring 132 also interacts with internal geometry of connector body 124, which may be secured to inner housing 120 using a snap-fit or the like. For example, FIGS. 1 and 2 illustrate a rear portion of the housing 120 having cut-outs or slots 136 on opposite sides so as to define a split shroud. The connector body 124 has tabs 138 configured to be snapped into slots 136 and retained therein due to the geometries of the components.

When the connector sub-assembly 10 is assembled as shown in FIG. 1, a front-end section 23 of ferrule 20 projects beyond front end 122 of housing 120. The front-end section 23 presents bare fiber section 40 for optical coupling with a mating component (e.g., another fiber optic connector; not shown). Note that the ferrule 20 aligns the bare fiber section 40 generally along a longitudinal inner-housing axis AH.

Figure 3:
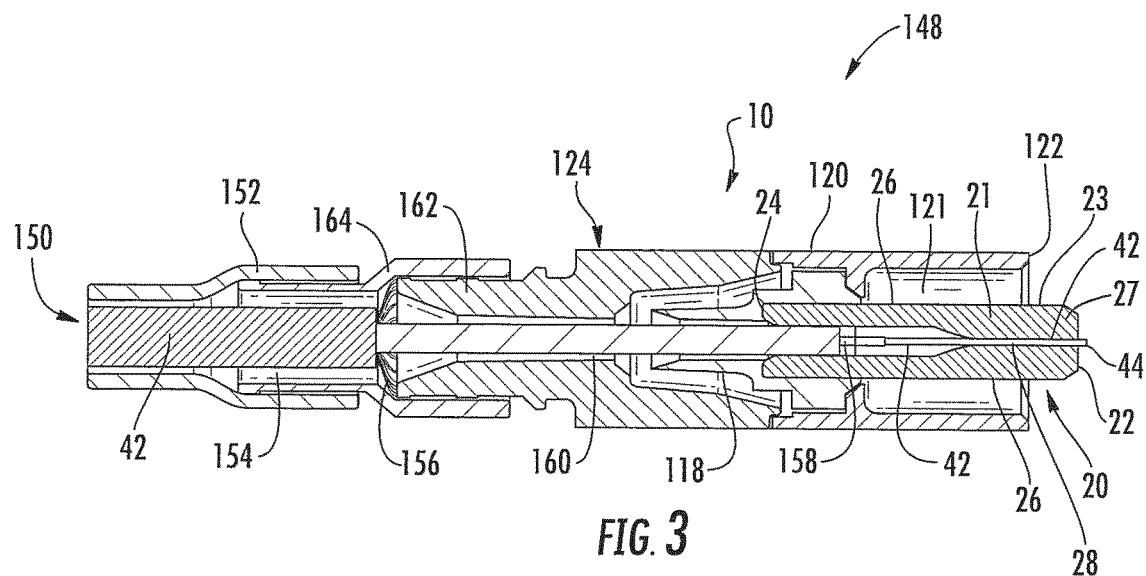
FIG. 3 is a cross-sectional view of the connector sub-assembly of FIGS. 1 and 2 operably connected to a fiber optic cable to form a cable sub-assembly.

FIG. 3 is a cross-sectional view of the connector sub-assembly of FIGS. 1 and 2, shown along with a fiber optic cable 150 ("cable") that operably supports optical fiber 42. FIG. 3 illustrates an example of how cable 50 can be terminated with connector sub-assembly 10 to form a cable sub-assembly 148. The particular cable 150 shown is merely to facilitate discussion, and other types of cables 150 can be used. In the embodiment shown, cable 50 includes an outer jacket 152, inner jacket 154, and strength members 156 in the form of aramid yarn. The optical fiber 42 in the embodiment shown includes a coating 158 and a buffer layer 160 ("tight buffer").

Portions of outer jacket 152 and inner jacket 154 have been removed from cable 50 to expose strength members 156, which are cut to a desired length and placed over a rear portion 162 of connector body 124. The strength members 156 are coupled to connector body 124 by a crimp band 164 (also referred to as a "crimp ring") that has been positioned over a portion of strength members 156 and inner jacket 154. Again, cable 150 is merely an example, as persons skilled in optical connectivity will appreciate how different cable and connector designs may be used in connection with the methods discussed below.

Figure 4:
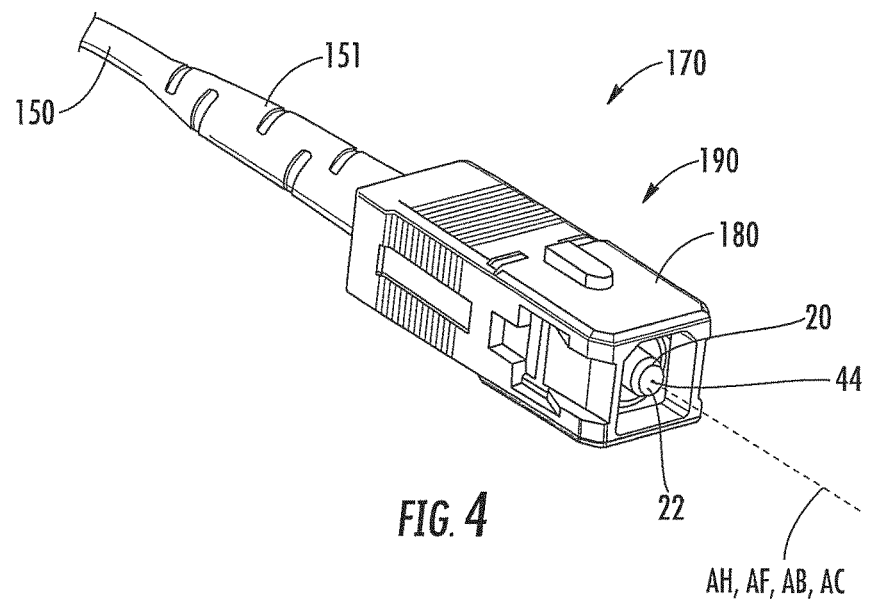
FIG. 4 is a perspective view of an example cable assembly formed by operably engaging an outer housing with the inner housing of the cable sub-assembly of FIG. 3.

FIG. 4 is a perspective view of a cable assembly 170 formed by operably engaging an outer housing 180 with inner housing 120. The connector sub-assembly 10 and outer housing 180 define a connector 182. A flexible boot 151 is employed to assist in mechanically connecting cable 150 to connector body 124 of inner housing 120 and to protect the components that are attached to rear portion 162 of connector body 124.

The Ferrule

Figure 5A:
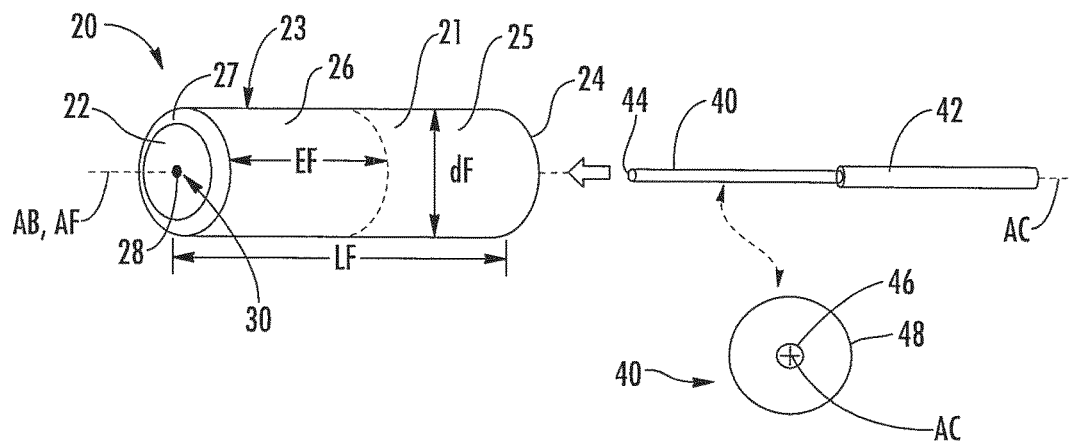
FIG. 5A is a perspective view of an example ferrule and optical fiber.

FIG. 5A is a perspective view of an example of ferrule 20 and optical fiber 42, and FIG. 53 is a side view of the ferrule 20. The ferrule 20 has a ferrule body 21 that is substantially cylindrical and in an example has a substantially circular cross-sectional shape. The ferrule 20 (i.e., ferrule body 21) has the aforementioned front and back ends 22 and 24, as well as an outer surface 26, and an axial bore 28. As can be appreciated, the outer surface 26 and axial bore 28 generally extend between the front and back ends 22 and 24. The front-end section 23 of ferrule 20 is adjacent front end 22. The ferrule 20 also includes a back-end section 25 adjacent back end 24.

The ferrule 20 has an axial length LF defined between the front and back ends 22 and 24, which may be 10.5 mm for an SC-type connector and 7.5 mm or an LC-type connector. The ferrule 20 also has a nominal diameter dF, which in this disclosure generally refers to the stated value for the diameter of ferrule 20 and/or a commonly-accepted value for an actual value of the diameter. For example, the nominal diameter dF may be 2.5 mm for SC-type connectors and 1.25 mm for LC-type connectors. Generally, ferrule 20 is not limited to specific types of connectors and so can have any reasonable nominal diameter dF and any reasonable length LF that might be used to form an optical fiber connector. An exemplary material for ferrule 20 is zirconia. Other materials for ferrule 20 include glass, metal, polymers, ceramics, and like materials, including combinations of the aforementioned materials, etc.

In an example, ferrule 20 includes a beveled section 27 at the front end 22 adjacent outer surface 26. The beveled section 27 transitions from the diameter of the front end 22 to the nominal diameter dF (generally defined by the outer surface 26 in the embodiment shown). As also shown in FIG. 3, axial bore 28 is sized to hold bare fiber section 40 formed at an end of optical fiber 42. A front end face 44 of bare fiber section 40 resides substantially at front end 22 of ferrule 20. The bare fiber section 40 includes a central core ("core") 46 surrounded by a cladding 48. The core 46 has a central axis AC.

The axial bore 28 has a central axis ("bore axis") AB while ferrule body 21 has a central axis AF that runs through a "true center" 30 of the ferrule body that is based on outer surface 26. The true center 30 may, for example, represent the geometric center of ferrule body 21 based on the cross-sectional shape of outer surface 26. In other words, in such an example, true center 30 corresponds to the geometric center of the cross-sectional shape of ferrule 20.

In an example, the cross-sectional shape of outer surface 26 is perfectly circular, in which case the true center 30 is at the center of the circle, with central axis AB of axial bore 28 running through the true center 30 and thus being coaxial with the central axis AF of ferrule 20. FIG. 4 shows this ideal case where the central axis AH of inner housing 120, the central axis AB of axial bore 28, the central axis AF of ferrule 20, and the central axis AC of core 46 are all co-axial. In practice, there can and will be some amount of lateral offset between these axes due to manufacturing errors. For example, in practice, axial bore 28 may only be nominally centered on the true center 30 of ferrule 20, i.e., to within a manufacturing tolerance, e.g., 1.0 micron (μm), 0.5 μm, or 0.3 μm.

Figure 5B:
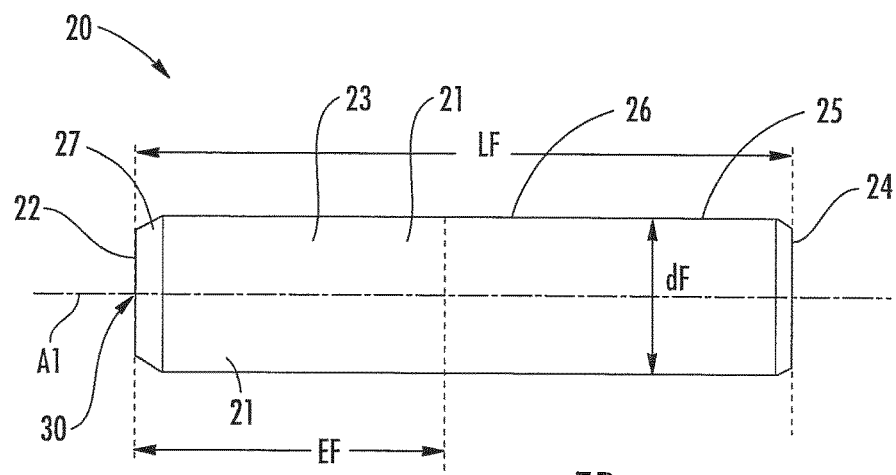
FIG. 5B is a side view of the ferrule.
Figure 5C:
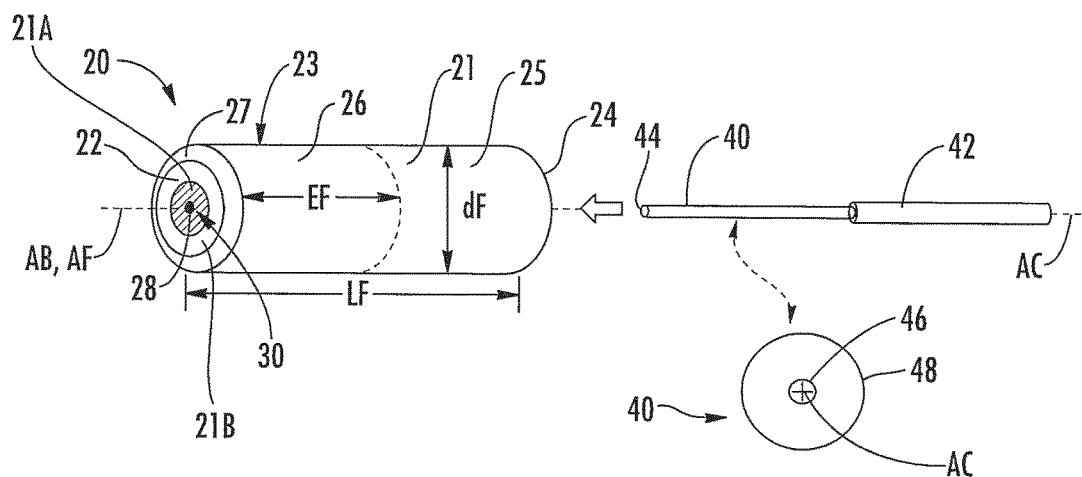
FIGS. 5C and 5D are similar to FIGS. 5A and 5B and illustrate an example of a two-piece ferrule having inner and outer members.
Figure 5D:
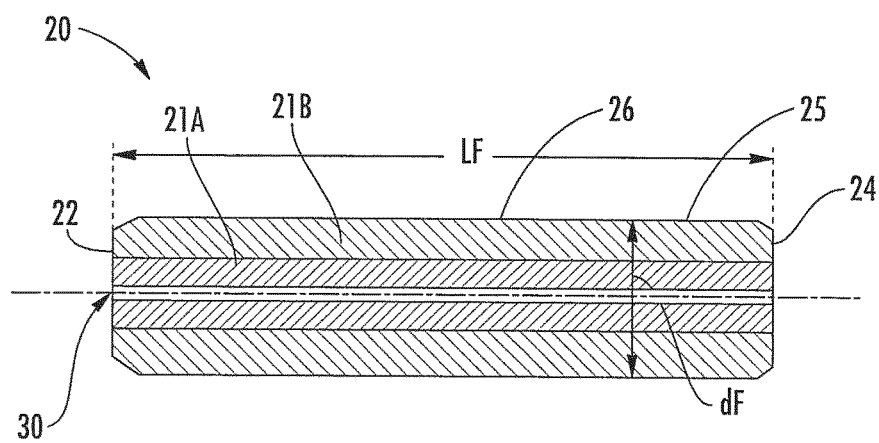

FIGS. 5C and 5D are similar to FIG. 5A and FIG. 5B, and illustrate an example ferrule 20 having a two-part ferrule construction wherein ferrule body 21 includes or consists of an inner member 21A (or "inner part 21A") and an outer member 21B (or "outer part 21B") that surrounds the inner member and defines outer surface 26. The inner member 21A includes axial bore 28 in its center and, in the embodiment shown, is generally cylindrical. The inner member 21A may be formed from a first material, and the outer member 21B (also generally cylindrical) may be formed from a second material that is less rigid than the first material. For example, the first material may comprise a ceramic material, and the second material may comprises a polymer, metal, glass, or different ceramic material. Unless otherwise noted, any discussions herein relating to ferrule 20 may apply to either one-piece ferrules (e.g., ferrule 20 in FIGS. 5A and 5B) or multi-piece ferrules (e.g., two-piece ferrule 20 in FIGS. 5C and 5D and variations where there may be one or more intermediate layers or members between inner member 21A and outer member 21B).

Various techniques for determining true center 30 of ferrule 20 will be appreciated by those skilled in the art. For example, true center 30 may be determined by axially rotating ferrule 20 while measuring a distance between the outer surface 26 and a reference point. For a perfectly circular ferrule, a plot of this distance versus the angle of rotation traces a sinusoid if the rotation axis is not on the true center. The true center 30 can be determined from the shape of the sinusoid. If the ferrule is not perfectly circular (perfectly circularly symmetric), then the plot of distance vs. rotation angle will show small deviations from a perfect sinusoid that are indicative of the magnitude of the asymmetry. Regardless, curve fitting techniques may be used to associate a curve with the distance values measured at different rotation angle so that true center 30 can be determined from the shape of the curve (e.g., a line in the event the rotational axis is aligned with the true center and a sinusoid in the event the rotational axis is not aligned with the true center). Detailed examples based on these and related principles are disclosed in US. Patent Application Publication No. US2015/0177097 ("the '097 Publication), the disclosure of which is incorporated herein by reference.

In some embodiments, true center 30 may be based on only some of the measurements between outer surface 26 and a reference point when rotating ferrule 20. For example, the measurements taken for a 360 degree rotation of ferrule 20 may be analyzed to determine the "highest" locations on outer surface 26. These are the points on outer surface 26 most likely to influence how ferrule 20 fits within a sleeve of an adapter or the like. As few as three points (e.g., the three "highest" locations on outer surface 26) may be used in some embodiments to determine true center 30. To this end, true center 30 may represent the geometric center of the selected points (three or more) used for such a "high fitting" approach.

In an example, ferrule 20 need not have a perfectly circular cross-sectional shape; it just needs to fall within an overall diameter tolerance (i.e., have a maximum outer diameter within a certain range of the nominal diameter dF). In some embodiments, ferrule 20 may additionally or alternatively need to satisfy a circularity tolerance. As used herein, "circularity" refers to all points on outer surface 26, when viewed in a cross-section perpendicular to central axis AF of ferrule 20, being equidistant from true center 30. The term "circularity error" or "circularity value" is used as a characterization of non-circularity (i.e., out-of-roundness) and is considered as the difference in radius between the two best fitting concentric circles within which the cross-sectional profile of outer surface 26 is contained.

The term "circularity tolerance" refers to the maximum acceptable circularity error, i.e. the maximum acceptable radial distance between two concentric circles within which all points on the cross-section of outer surface 26 lie.

For the purpose of the present disclosure, higher values for circularity error reflect the circularity error becoming worse (e.g., ferrule 20 becoming less circular) whereas lower values reflect the circularity error being improved (e.g., ferrule 20 becoming more circular). For a ferrule 20 that has a nominal diameter dF of 1.25 mm or 2.5 mm, an example diameter tolerance is +/−1.0 μm or even +/−0.5 μm, and an example circularity tolerance is 1.0 μm or even 0.5 μm. The diameter tolerance and the circularity tolerance may alternatively or additionally be defined in relation to the nominal diameter dF. For example, the diameter tolerance may be +/−0.04% or +/−0.02% of the nominal diameter dF of ferrule 20, while the circularity tolerance may be 0.04% or 0.02% of the nominal diameter dF. In other examples, there is no tolerance on the circularity or the diameter, as explained below.

The overall diameter tolerance and overall circularity tolerance, if required, constrain the amount by which outer surface 26 of ferrule 20 can be reshaped. Spreading out the reshaping over a relatively large portion of outer surface 26, e.g., over a quadrant, allows the reshaping process to not exceed the applicable tolerance(s), as discussed below. The applicable tolerance(s) may facilitate the portion of front-end section 23 of ferrule 20 establishing the optical connection between connectors using an adapter module with an alignment sleeve, as described below. In some cases where the ferrule reshaping is more than just a slight deformation to the shape of outer surface 26, the circularity and diameter tolerances can become extremely relaxed or non-existent since ultimately the main consideration at play is a decrease in the insertion loss.

Figure 6A:
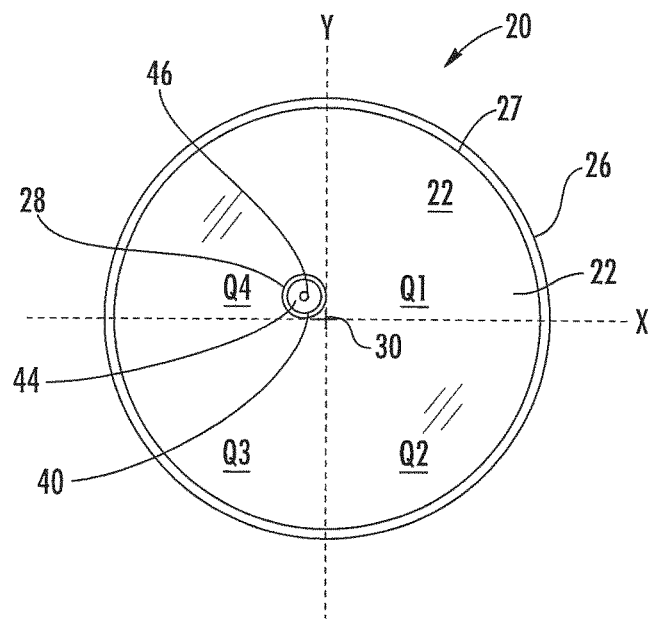
FIG. 6A is a front-end view of the ferrule of FIGS. 5A and 5B showing a core of the optical fiber being radially offset from a true center of the ferrule (scale is exaggerated for clarity)

FIG. 6A is a front-end view of an example ferrule 20 showing the end face 44 of bare fiber section 40 within axial bore 28. A Cartesian coordinate system in a plane perpendicular to central axis AF of ferrule 20 may be defined with an x-axis and y-axis passing through true center 30, as shown in the close-up view of FIG. 6B. The ferrule 20 can be divided into four quadrants Q1, Q2, Q3 and Q4, as shown, based on the Cartesian coordinate system.

Figure 6B:
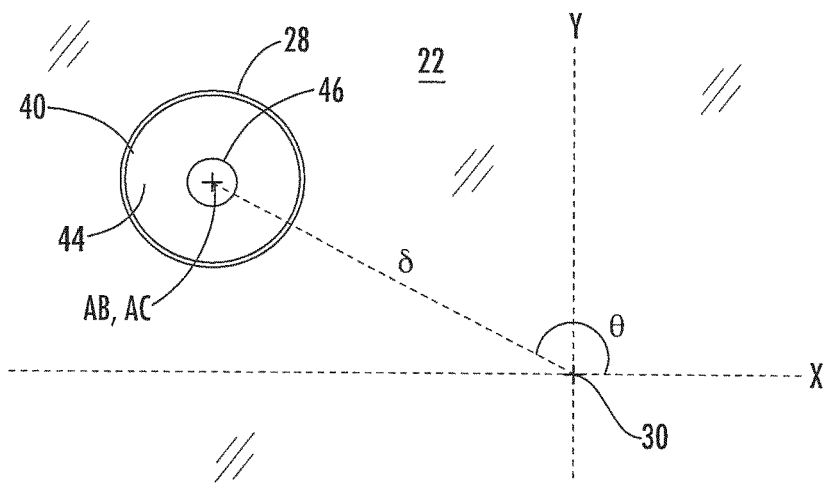
FIG. 6B is a close-up view of FIG. 6A, showing how a core-to-ferrule concentricity error is represented in polar coordinates as a vector $E=(\delta, \theta)$, where $\delta$ is the size (magnitude) of the offset and $\theta$ is the direction of the offset relative to a reference line, which is shown by way of example as an x-axis passing through the true center of the ferrule.

FIG. 6A also illustrates an example core-to-ferrule concentricity error, which is exaggerated for ease of illustration. The close-up view of FIG. 6B shows core 46 of bare fiber section 40 offset from true center 30 by an amount (magnitude) δ in a direction (angle) θ measured relative to the +x axis in the plane perpendicular to the central axis AF. Thus, the core-to-ferrule concentricity error can be represented an error vector E=(δ,θ) using polar coordinates, wherein the bold denotes vector status. Hereinafter, the core-to-ferrule concentricity error is simply referred to as the "concentricity error E". As noted above, this error is also referred to in the art as the "coaxial error" or "coaxiality error." Also note that the offset distance δ of core 46 is generally measured with reference to central axis AC of core 46 (i.e., the distance δ is measured from true center 30 to the center of core 46), at the front end face 44 of bare fiber section 40 (which, as mentioned above, resides substantially at front end 22 of ferrule 20).

Figure 6C:
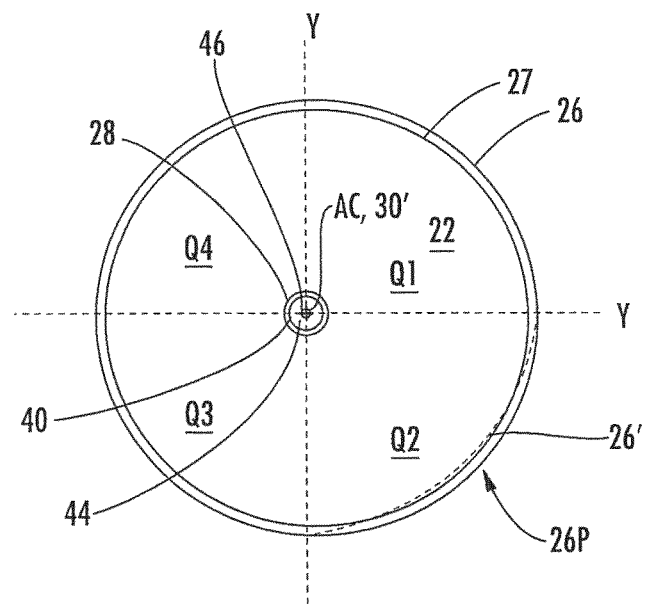
FIG. 6C is similar to FIG. 6A and shows a portion of an outer surface of the ferrule in a lower right quadrant of the ferrule having been reshaped to move the true center of the ferrule to a "new" true center that coincides with the central axis of the core of the optical fiber residing within the ferrule bore.
Figure 6D:
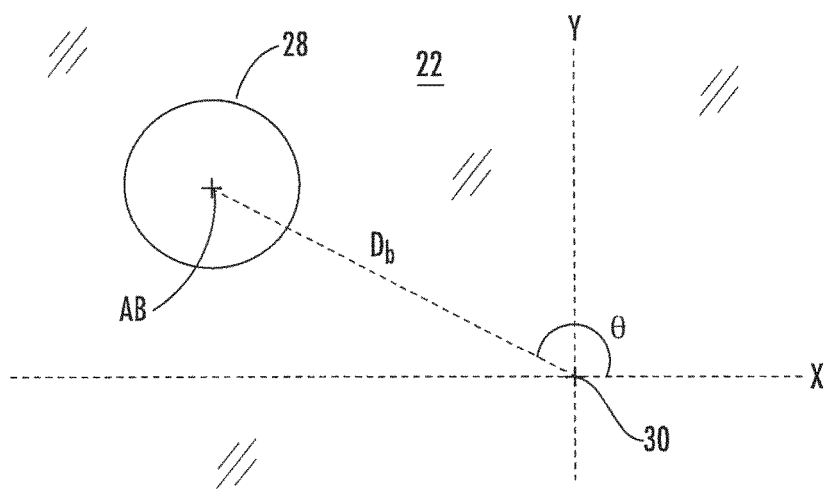
FIG. 6D is similar to FIG. 6B and shows just the ferrule and bore and illustrates an example of a bore offset distance $D_b$ relative to the true center.

FIG. 6D is similar to FIG. 6B and shows an example ferrule without the bare fiber section 40 within axial bore 28, illustrating an offset distance $D_b$ as measured radially from true center 30 to central axis AB of axial bore 28.

There are a number of manufacturing errors that can contribute to the concentricity error E, including: 1) offset of core 46 relative to cladding 48; 2) an offset of bare fiber section 40 within axial bore 28; and 3) an offset (non-centering) of axial bore 28 relative to true center 30 of ferrule 20. These error contributions tend to be random so that the precise location of core 46 relative to the outer surface 26 (and thus relative to the true center 30) in a given cable sub-assembly 110 is typically not known unless it is measured.

Measurement of concentricity error E may be made using a non-contact measurement system, such as disclosed the aforementioned '097 Publication. It is noted that such non-contact measurements are made with increasing accuracy and precision if more of the outer surface 26 is exposed in front-end section 23 of ferrule 20 because distance sensors can be used to measure the outer surface at more axial locations than just a small exposed end portion of the outer surface.

Alternatively, the concentricity error E may be measured using a contact method that does not utilize a master connector (i.e., a reference connector) to establish an optical connection. An example of such a method is employed by the Koncentrik-V2 measurement system from Data-Pixel SAS of Chavanod, France, wherein ferrule 20 of cable sub-assembly 110 is disposed on a precision ball array or sleeve. In other examples, the concentricity error E may be measured using a contact method that utilizes a master connector.

Measurements of concentricity error E made on about 1000 cable sub-assemblies 148 indicate that the magnitude $\delta$ of the concentricity error E generally falls in the range from about 0 μm to about 1.2 μm, with the average being about 0.4 μm.

Once the concentricity error E is measured, the next step of the method is to reduce this error by defining a "new" true center 30' by reshaping outer surface 26 of ferrule 20, as shown in FIG. 6C to form a new outer surface 26'. This can be accomplished by selectively removing material from ferrule body 21 at one or more portions of outer surface 26 of ferrule 20. Alternatively or additionally, this can be done by enlarging ferrule body 21 at one or portions of outer surface 26 (e.g., by localized expansion of existing material or by adding new material).

The term "deformation" is used herein to generically refer to a deviation or change from the initial cross-sectional shape of outer surface 26 that results from the reshaping process. Thus, a deformation may result from either removal of material from ferrule body 21 or enlarging ferrule body 21 (e.g., either by localized expansion or adding material) at the location of the change in shape. In other words, the reshaping process may include making at least one deformation to outer surface 26. The deformation(s) may, for example, comprise one or more of the following: a segment on the outer surface 26 of reduced curvature relative to a remainder of the outer surface; a groove in the outer surface; a protuberance formed on the outer surface by local expansion of material of the ferrule; and a protuberance formed on the outer surface by applying additional material to the ferrule. Depending on the particular embodiment, there may be deformation(s) in all of the quadrants Q1, Q2, Q3, Q4 (FIG. 6A) or in less than all of the quadrants (e.g., in only one of the quadrants or in only two of the quadrants).

As noted above, in some examples, the surface reshaping may be constrained by at least one of a diameter tolerance and a circularity tolerance. In other examples, the surface reshaping can be performed without regard to either or both of these tolerances, as the ultimate objective is a decrease in the insertion loss as compared to the original-shaped ferrule. Insertion loss may be determined using any suitable technique. For example, insertion loss may be determined using contact-based techniques where cable assembly 170 (or cable sub-assembly 148) is mated to one or more reference cable assemblies ("reference jumpers") with "reference grade connectors". Some of such techniques use light sources and power meters, while others use an optical time domain reflectometer (OTDR). Alternatively, insertion loss may be determined using non-contact-based techniques, such as those disclosed in U.S. Patent Application Pub. Nos. 2016/0033325 and 2016/0061690, both of which are herein incorporated by reference.

With reference again to FIG. 6C, the portion of outer surface 26 in the lower right quadrant Q2 has been reshaped to move the true center 30 of ferrule 20 to a new true center 30' that coincides with the central axis AC of core 46 of bare fiber section 40 residing within axial bore 28. Ideally, the new true center 30' created by the surface reshaping process resides exactly on central axis AC of core 46 as shown in FIG. 6C, so that $\delta=0$. However, a substantial reduction in the size (magnitude) of the concentricity error E to a new value $E'=(\delta', \theta')$, wherein $|E'|<|E|$ (i.e., $\delta'<\delta$) can be satisfactory if it substantially reduces the insertion loss and increases the coupling efficiency as compared to the insertion loss and coupling efficiency associated with the original concentricity error E. In an example, a substantial reduction in the insertion loss is 0.01 dB or greater.

In various examples, the magnitude of the new concentricity error $|E'|=\delta'$ is at least 5% less than $|E|=\delta$, or is at least 10% less than $|E|=\delta$, or at least 20% less than $|E|=\delta$, or is at least 50% less than $|E|=\delta$, or is at least 75% less than $|E|=\delta$, or is at least 90% less than $|E|=\delta$. In an example, the direction component $\theta$ of the concentricity error E provides information about which portion of outer surface 26 to reshape, e.g., the portion of the outer surface that resides generally at (e.g., centered at) $\theta$ for material enlargement/addition and $\theta$-180 degrees for material removal.

The magnitude of the new concentricity error $|E'|=\delta'$ can alternatively or additionally be expressed in terms of the nominal diameter dF of ferrule 20. In some embodiments, the magnitude of the new concentricity error $|E'|=\delta'$ is less than 0.048% of the nominal diameter dF, or even less than 0.024% of the nominal diameter dF, or even smaller (e.g., less 0.012% of the nominal diameter dF). The distance $\delta'$ may be, for example, less than 1.2 μm, less than 0.6 μm, or even less than 0.3 μm for a ferrule having a nominal diameter dF of 1.25 mm or 2.5 mm.

Figure 7A:
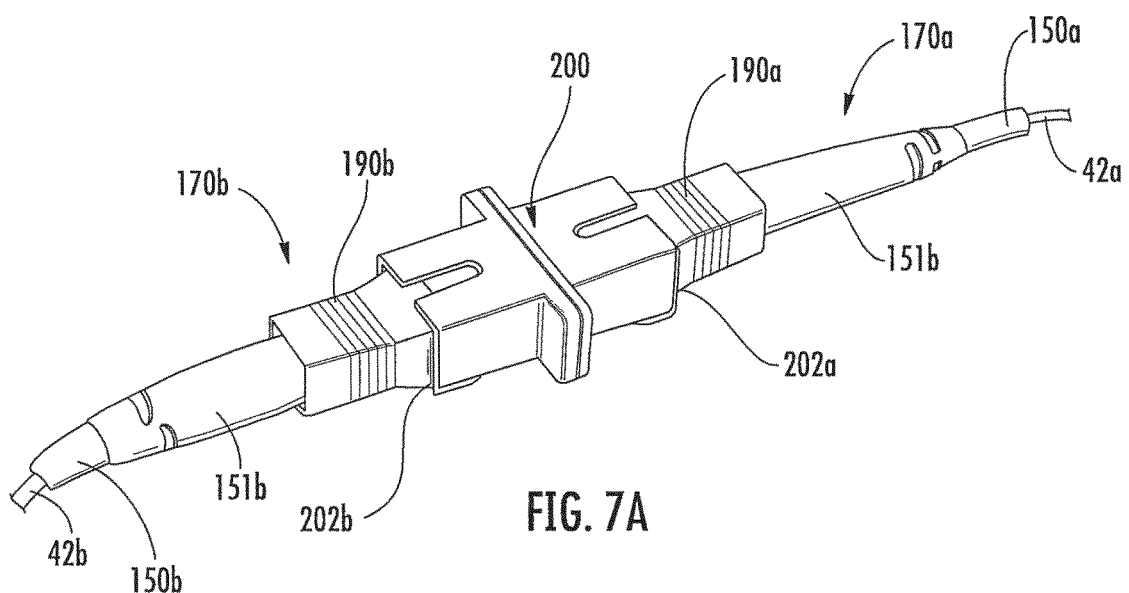
FIG. 7A is an elevated view of two cable assemblies operably connected at their respective connectors via an adapter module.

FIG. 7A shows cable assemblies 170a and 170b with respective cables 150a, 150b, connectors 190a, 190b, and boots 151a, 152b. The cable assemblies 170a, 170b are operably connected ("mated" or "coupled") using via an adapter module (or simply "adapter") 200 that includes opposite input ends 202a, 202b. The adapter module 200 is configured to receive connectors 190a, 190b in respective input ends 202a, 202b to establish an optical connection between the optical fibers 42a, 42b respectively carried by cables 150a, 150b.

Figure 7B:
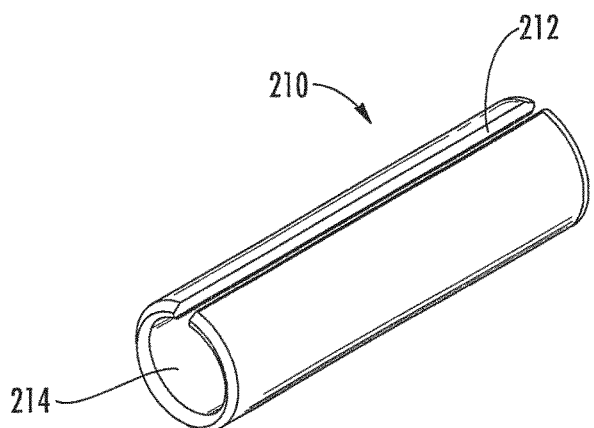
FIG. 7B is an alignment sleeve that resides in the adapter module of FIG. 7A and that receives respective front-end sections of the two ferrules of the two connectors of the two cable assemblies of FIG. 7A.

The adapter module 200 also includes an alignment sleeve 210, as shown in the perspective view of FIG. 7B. The alignment sleeve 210 in the embodiment shown has a C-shaped cross-section defined by an axially running slot 212. The alignment sleeve 210 also has an interior 214 with a diameter that is slightly smaller than the diameter of ferrules 20a, 20b (FIG. 7C) of connectors 190a, 190b.

Figure 7C:
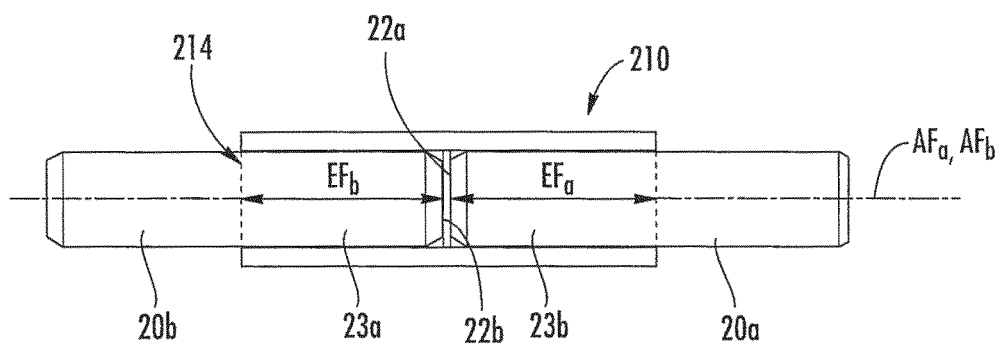
FIG. 7C is a cross-sectional view of the alignment sleeve of FIG. 7B and shows two ferrules operably arranged within an interior of the alignment sleeve.

FIG. 7C is a cross-sectional view of alignment sleeve 210 with the respective front-end sections 23a, 23b of ferrules 20a, 20b residing in interior 214 so that respective front ends 22a and 22b of ferrules 20a, 20b are confronting. The axially running slot 212 allows alignment sleeve 200 to expand slightly to accommodate the front ends 23a, 23b. This results in a tight fit of respective front-end sections 23a, 23b of ferrules 20a, 20b within interior 214 of alignment sleeve 210 so that the respective ferrule axes $AF_a$ and $AF_b$ are substantially aligned. The respective lengths of the front-end sections 23a, 23b are denoted in FIG. 7C as $EF_a$ and $EF_b$ respectively. In an example, $EF_a$ and $EF_b$ are in the range from 2 mm to 5 mm, or 2 mm to 4 mm. FIG. 7C illustrates how the shape of the front-end section 23 of each ferrule 20 determines how each ferrule will sit within the interior 214 of alignment sleeve 210 and align with the other ferrule.

When two connectors 190 are modified using the methods disclosed herein to have a reduced concentricity error E and are then mated (e.g. using adapter module 200), the resulting connection has improved (and in some cases, may even maximize) coupling efficiency. As noted above, in some examples, the main criterion—and perhaps only criterion—for the reshaping process may be that the coupling efficiency be increased, i.e. the insertion loss be reduced, by decreasing the lateral offset between fiber cores (e.g., central core 46) of each connector.

Ferrule Reshaping Methods

FIGS. 8A through 8E illustrate several different example methods of reshaping a portion of outer surface 26 of ferrule 20. Each of the examples may involve remaining within a circularity and/or diameter tolerance of the ferrule if such tolerances are required, or may be performed without regard to any diameter and/or circularity tolerances.

Figure 8A:
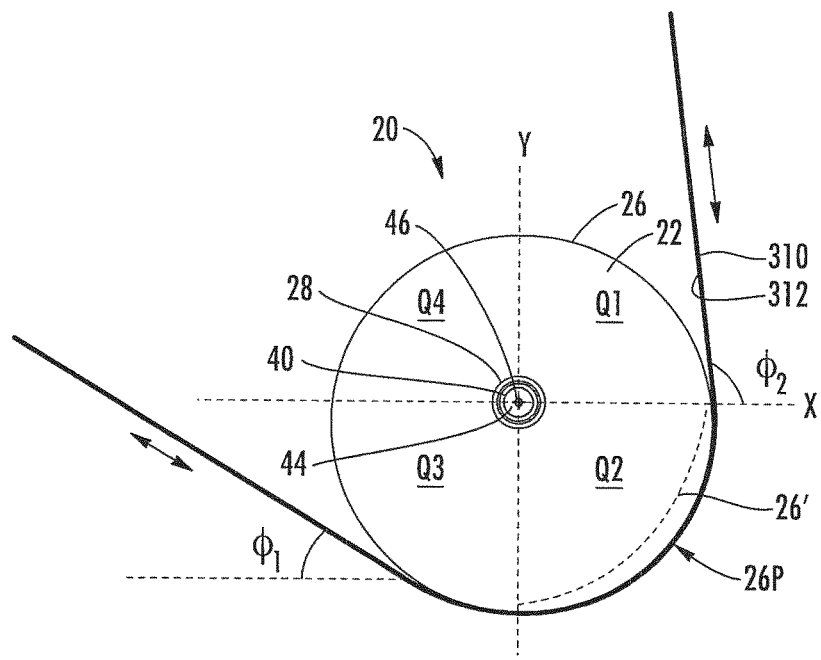
FIG. 8A is a front-end view of an example ferrule shown with a portion of its outer surface being reshaped by an abrasive belt.

To this end, FIG. 8A is a close-up front-end view of ferrule 20 that shows an example wherein an abrasive belt 310 with an abrasive surface 312 engages a portion 26P of outer surface 26 to remove material therefrom. The abrasive surface 312 may hew to the curved shape of the ferrule 20 as much as possible. The amount of surface area of outer surface 26 engaged by abrasive belt 310 can be varied as needed, e.g., by changing angles φ1 and φ2 the abrasive belt makes with the outer surface. An example abrasive belt 310 is or includes a diamond lapping film. Material removal rates can be controlled by the belt speed, the belt pressure, and the grit or roughness of the abrasive belt 310.

Figure 8B:
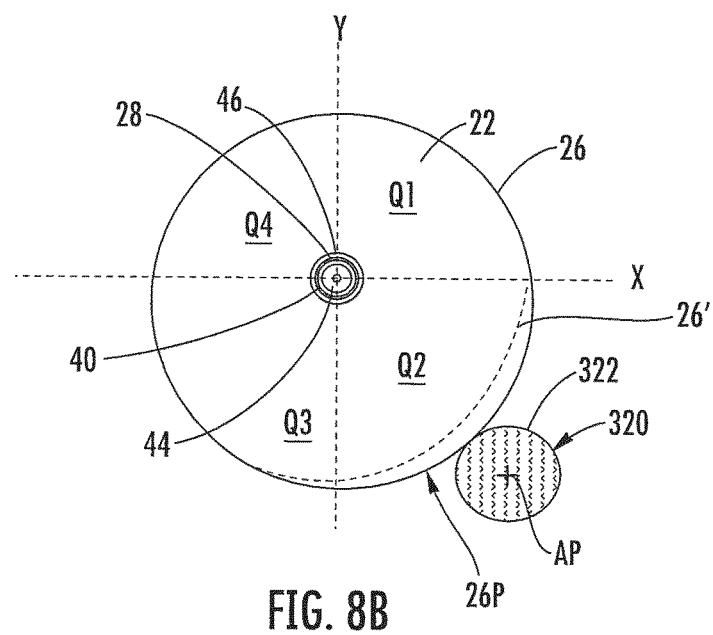
FIG. 8B is a front-end view of an example ferrule shown with a portion of its outer surface being reshaped using a cylindrical abrasive member.
Figure 8C:
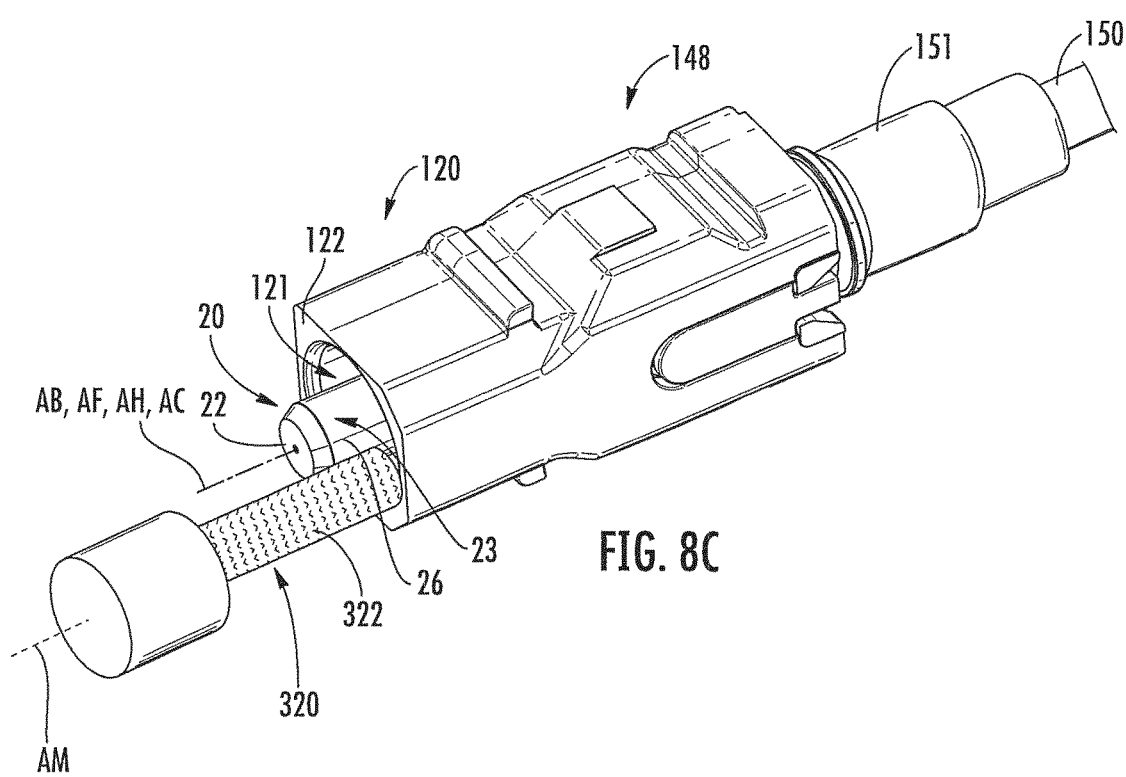
FIG. 8C is front-elevated view of the example material removal configuration of FIG. 8B.

FIG. 8B is a close-up front-end view of ferrule 20 and FIG. 8C is a front-elevated view of cable sub-assembly 110, both showing an example wherein a rotating cylindrical abrasive member 320 engages portion 26P of outer surface 26 to remove material therefrom. The abrasive member 320 has a central axis AM that is substantially parallel to ferrule central axis AF. The abrasive member 320 has an abrasive outer surface 322. Because the contact area between abrasive member 320 and outer surface 26 of ferrule 20 is relatively thin and long, the abrasive member is also translatable to cover a desired amount of surface area of outer surface 26 in portion 26P. The rate of material removal can be controlled by the rotation rate, pressure, and surface roughness of abrasive member 320.

Figure 8D:
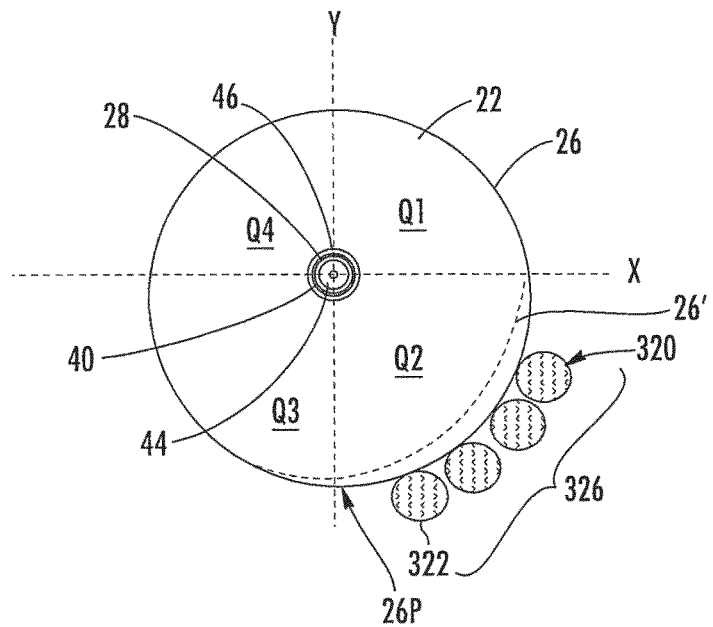
FIG. 8D is similar to FIG. 8B and shows multiple abrasive members being used to reshape a portion of the outer surface of the ferrule.

FIG. 8D is similar to FIG. 8B and illustrates an example wherein an array 326 of multiple rotating cylindrical abrasive members 320 engage outer surface 26 at portion 26P. Each abrasive member 320 can be independently translatable, and the array 326 can also be translatable, i.e., the abrasive members can be moved together.

Figure 8E:
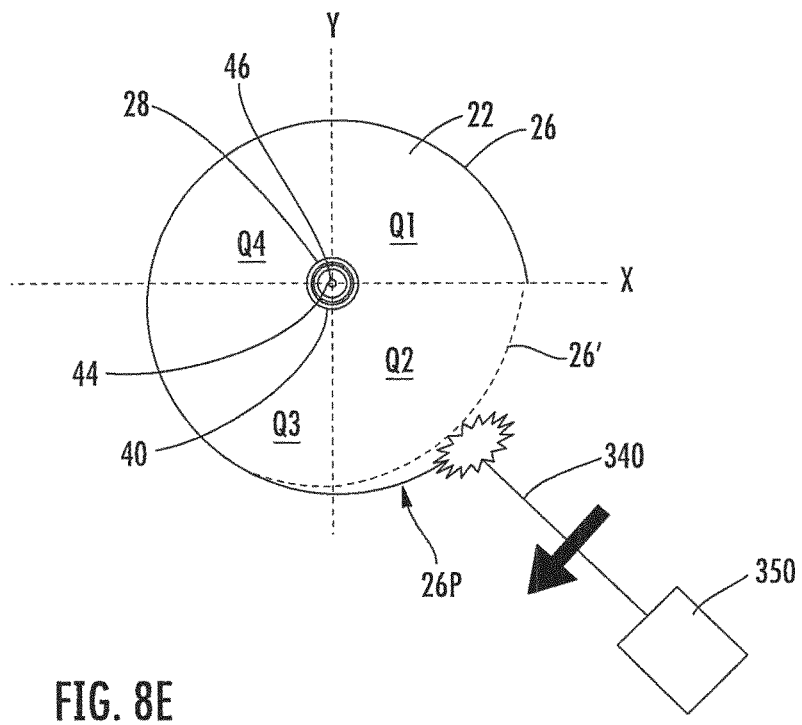
FIG. 8E is a front-end view of an example ferrule shown with a portion of its outer surface being reshaped by removing material using a laser beam.

FIG. 8E is similar to FIG. 8A and illustrates an example wherein a laser beam 340 from a laser system 350 is used to remove (e.g., ablate) material from outer surface 26 at portion 26P.

Figure 8F:
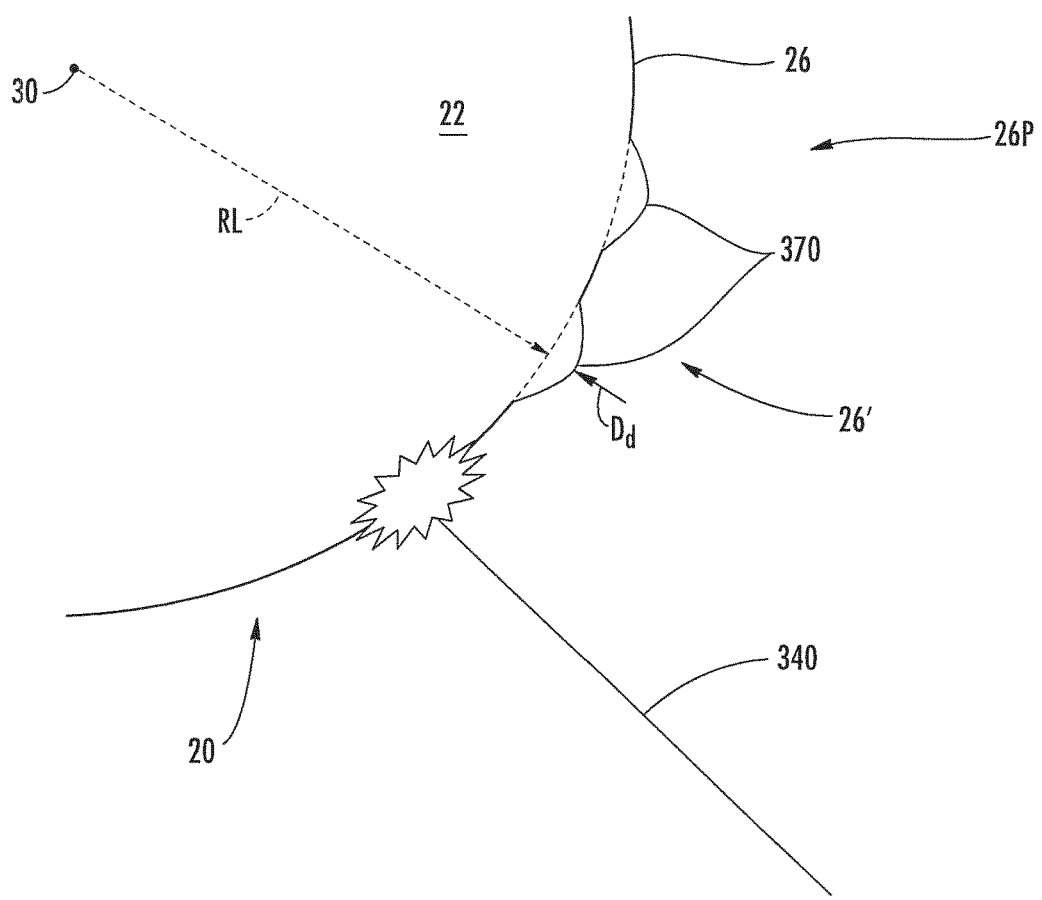
FIG. 8F is similar to FIG. 8E, and illustrates an example where the laser beam is used to reshape the outer surface of the ferrule by causing the material that makes up the ferrule to locally expand to form protuberances on the outer surface.

FIG. 8F is similar to FIG. 8E and illustrates an example wherein a laser beam 340 from a laser system 350 is used to form protuberances 370 on outer surface 26 at portion 26P. The protuberances 370 in this example are formed by the ferrule material undergoing local expansion or swelling when locally irradiated by laser beam 340. An example process for forming such laser-induced protuberances 370 is described in U.S. Pat. Nos. 7,724,992, 7,792,404, 8,291,729 and 8,397,537, which are incorporated by reference herein. It will be appreciated, however, that protuberances 370 may alternatively be formed by other techniques, such adhering, fusing, or otherwise depositing material on outer surface 26.

In some embodiments, protuberances 370 may be formed along the length of the ferrule 20 in select locations on outer surface 26 so that three high-point locations (deformations) 26' on outer surface 26 can cause and adjustment of the ferrule location within alignment sleeve 200 (FIG. 7B). The protuberances 370 in these and other embodiments may be arranged in a variety of configurations. For example, there may be a plurality of protuberances 370 circumferentially distributed on outer surface 26 of ferrule 20. Alternatively, there may be a plurality of protuberances 370 distributed on outer surface 26 in a ring-shaped or spiral-shaped pattern along a length of ferrule 20. These possibilities may apply not just to arrangements of the protuberances 370, but also more generally to arrangements of other types of deformations.

FIG. 8F also shows a reference line RL that passes through deformation 26' and through true center 30. The deformation 26' in surface 26 formed by protuberances 370 deviate from the original or nominal surface 26 (dashed line) by a distance $D_d$ as measured along reference line RL. Any of the different types of deformations disclosed herein can be measured by distance $D_d$, and this distance is illustrated in connection with protuberances 370 by way of illustration. In embodiments where ferrule 20 has a nominal diameter dF of at least 1.25 mm (e.g., 1.25 mm or 2.5 mm, as may be the case for ferrules used with LC or SC connectors, respectively), the distance $D_d$ may be at least 0.05 μm. The distance $D_d$ may even be at least 0.1 μm in such embodiments. An alternative way of characterizing the distance $D_d$ may in terms of the nominal diameter dF, such the distance $D_d$ being at least 0.04% of the nominal diameter dF.

Figure 10A:
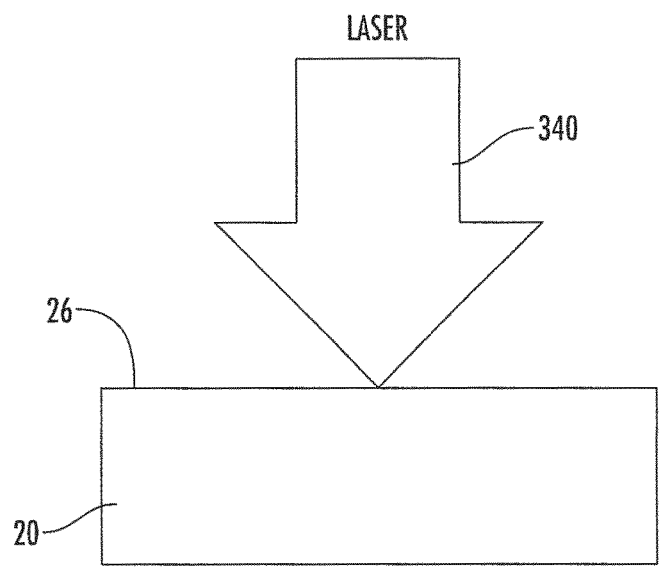
FIGS. 10A and 10B are schematic views illustrating a process to create a crater and micro-protuberances on the outer surface of a ferrule.
Figure 10B:
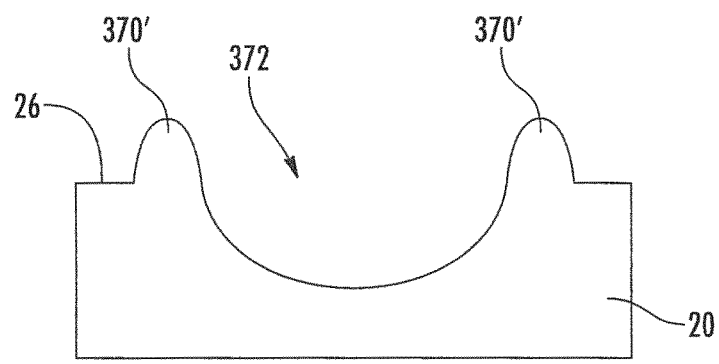

In another embodiment, as shown in FIGS. 10A, 10B, laser beam 340 irradiates outer surface 26 of ferrule 20 to create, from outer surface 26, a crater 372 (FIG. 10B) on ferrule surface 26 with protuberances 370' positioned opposite each other on either side of crater 372. Stated another way, protuberances 370' are positioned opposite each other and define a crater 372 therebetween. Protuberances 370' can be formed by swelling of the outer surface 26 of ferrule 20. Protuberances adjacent a crater, like protuberances 370', will be referred to as "micro-protuberances" in this disclosure. The wavelength of laser beam 340 may be between 10 nanometers (nm) and 20,000 nm, between 100 nm and 2000 nm, or 150 nm and 1000 nm. In one specific embodiment, the laser wavelength of laser beam 340 is between 355 nm and 532 nm.

When applied onto outer surface 26 of ferrule 20, laser beam 340 is focused onto ferrule 20 such that an average power delivered to ferrule 20, within a time period that is between 1 pico-second to 1 second, is between 0.001 μJ/μm² and 1000 μJ/μm², or between 0.01 μJ/μm² and 100 μJ/μm², or between 0.1 μJ/μm² and 10 μJ/μm². It is contemplated that outer surface 26 may be irradiated by a laser beam 340 as a single laser pulse or burst or as a series of laser pulses or bursts. In one embodiment, the laser radiation (i.e., laser beam 340) can include pulses with an individual pulse width that ranges between 1 pico-second and 1 second.

As mentioned previously, the application of laser beam 340 onto outer surface 26 of ferrule 20 can create a crater 372 with micro-protuberances 370' on either side of crater 372 as shown in FIG. 10B. FIG. 10B shows crater 372 having a parabolic shape and micro-protuberances 370' having a hill-like shape. In one embodiment, crater 372 has a depth that ranges between 0.1 μm and 1000 μm, and micro-protuberances 370' have a maximum height that ranges between 0.02 μm and 100 μm. In another embodiment, crater 372 includes a cluster of micro-protuberances 370' on at least one side of crater 372 where the dept of the crater is between 0.1 μm and 1000 μm and the maximum height of the cluster of micro-protuberances 370' is between 0.02 µm and 100 µm It is contemplated and within the scope of the present disclosure that crater 372 and micro-protuberances 370' may have suitable alternate shapes and sizes.

Figure 11:
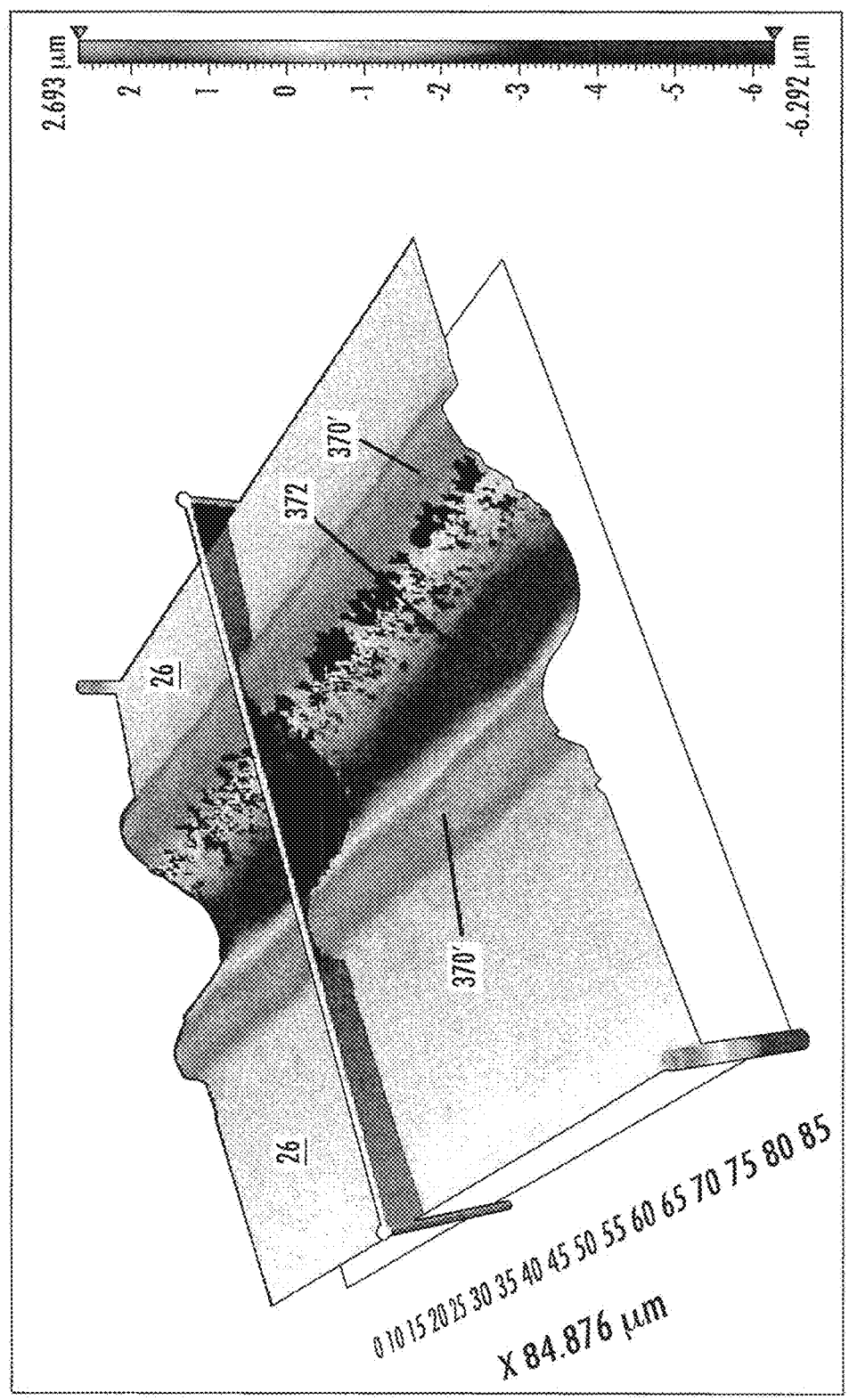
FIG. 11 is a graph illustrating the topography of the outer surface of a ferrule.

Craters 372 and micro-protuberances 370' can provide greater force distribution of sleeve 210 (FIG. 7B) when sleeve 210 is mated with ferrule 20. That is, a singular or a series of craters 372 and micro-protuberances 370' can distribute the force applied by sleeve 210 such that the outer surface 26 of ferrule 20 bears less of the applied force of sleeve 210. As shown in FIG. 11, a line crater 372 and corresponding micro-protuberances 370' are shown where micro-protuberances 370' bear the majority of the force applied by sleeve 210 (as indicated by the darker shading of micro-protuberances 370') thereby reducing the amount of force applied onto outer surface 26 of ferrule 20 and crater 372 by sleeve 210.

Figure 12:
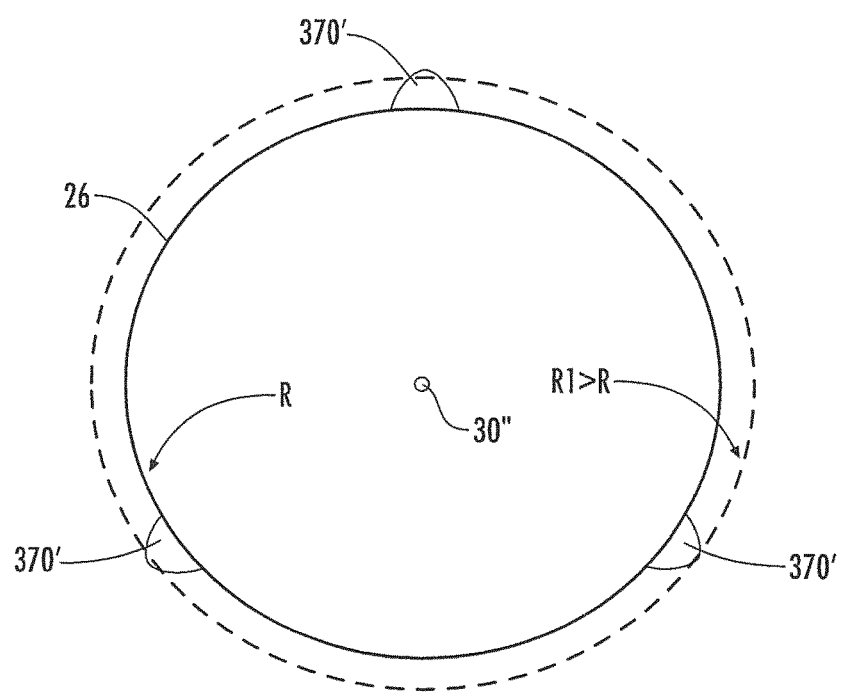
FIG. 12 is a front view of a ferrule including micro-protuberances and illustrating the increase in diameter associated with micro-protuberances.

Micro-protuberances 370' on ferrule surface 26 can also increase the diameter of ferrule 20 as shown in FIG. 12 where micro-protuberances 370' increase the diameter of ferrule 20 from R to R1.

Figure 13A:
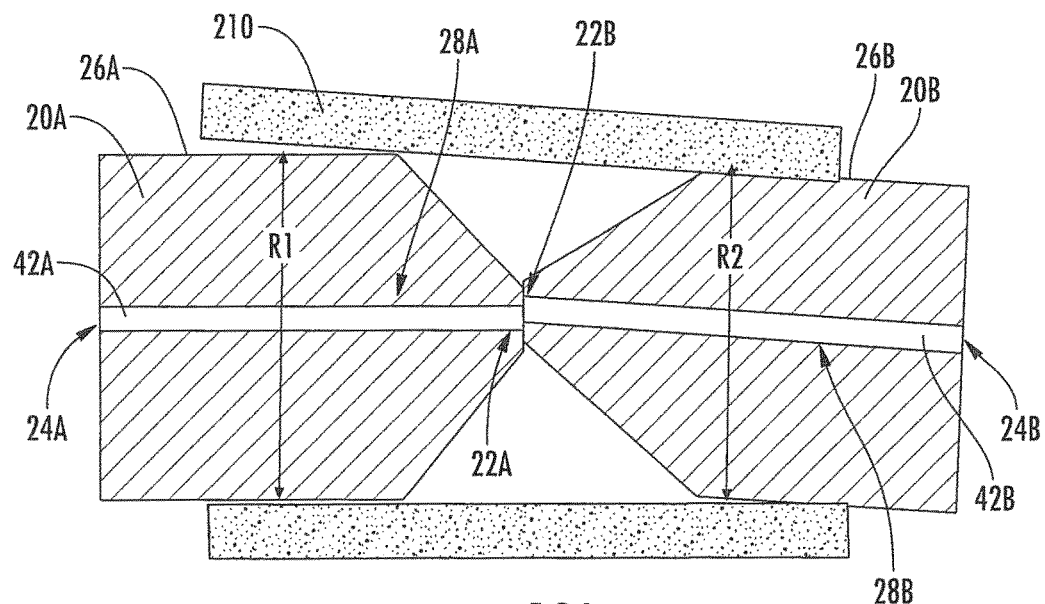
FIGS. 13A and 13B are cross-sectional views of a pair of ferrules with corresponding optical fibers within a sleeve illustrating the effect of micro-protuberances on the alignment of the ferrules and the optical fibers within the sleeve.
Figure 13B:
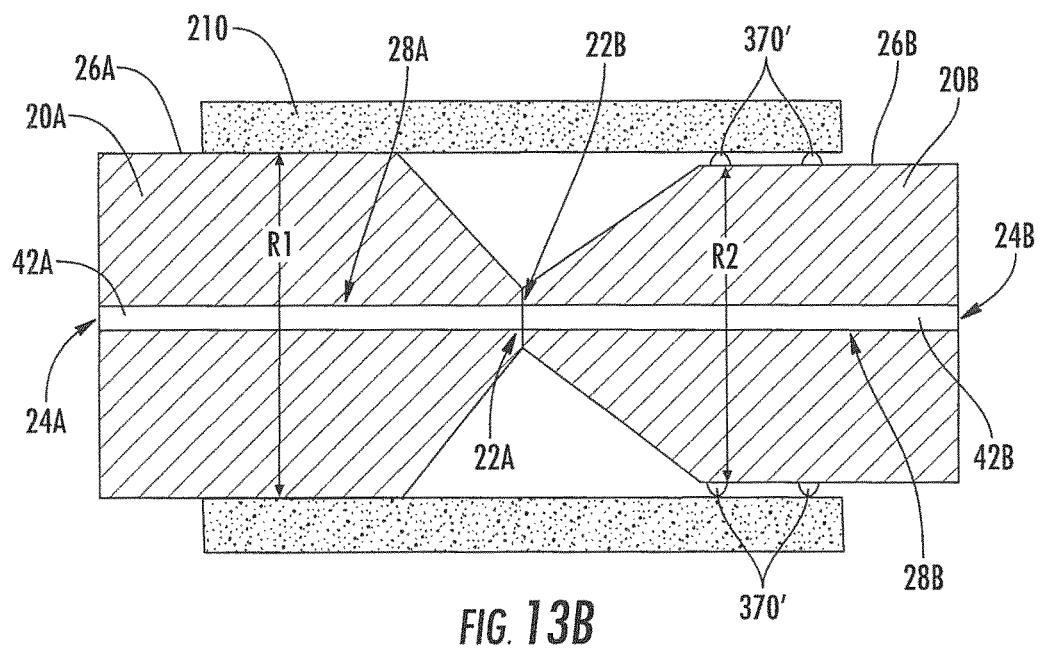

As shown in FIGS. 13A-B and discussed herein, an increase in ferrule diameter can also improve optical coupling between ferrules 20A, 20B with different diameters. FIG. 13A shows a first ferrule 20A and a second ferrule 20B inserted into sleeve 210 where the first ferrule 20A has a diameter R1 and the second ferrule 20B has a diameter R2 that is less than diameter R1. Each ferrule 20A, 20B includes a bore 28A, 28B that extends between the front ends 22A, 22B and back ends 24A, 24B of ferrules 20A, 20B, respectively. Bores 28A, 28B receive optical fibers 42A, 42B, respectively. As shown, within sleeve 210, ferrules 20A, 20B and optical fibers 42A, 42B are misaligned due to the difference in diameters of first ferrule 20A and second ferrule 20B. The misalignment yields poor optical coupling between the optical fibers 42A, 42B even if there is no fiber core misalignment with the ferrule. For the purpose of the discussion herein with respect to FIGS. 13A and 13B, it is assumed that there is no fiber core misalignment with the ferrule unless otherwise stated. However, it is within the scope of the present disclosure that there may also be fiber core misalignment with the ferrule as discussed herein.

As shown in FIG. 13B, micro-protuberances 370' positioned along outer surface 26B of ferrule 20B can increase the diameter R2 of ferrule 20B and reduce or eliminate the difference in diameters between ferrules 20A, 20B. As a result and as shown, the alignment between both the ferrules 20A and 20B and the optical fibers 42A and 42B is improved and thus, the optical coupling within sleeve 210 is also improved. Stated another way, micro-protuberances 370' increase the diameter R2 of the second ferrule 20B, which reduces the mismatch between the core of fiber 42B in the second ferrule 20B relative to the core of fiber 42A in the first ferrule 20A thereby improving the optical coupling between ferrules 20A, 20B and the respective optical fibers 42A, 42B by at least 0.01 decibels (dB). In one embodiment, the resulting offset/mismatch between the core of fiber 42A and the core of fiber 42B within sleeve 212 is between 0 µm and 3 µm. In another embodiment, both the diameters R1, R2 of first ferrule 20A and second ferrule 20B are increased (via the addition of micro-protuberances 370') to improve/reduce misalignment between the ferrules 20A, 20B. In yet another embodiment, the diameters R1, R2 of first ferrule 20A and second ferrule 20B are increase to a predetermined value. It is contemplated and within the scope of the present disclosure that the respective diameters and core alignments of ferrules 20A, 20B may be measured and/or altered either prior to insertion of ferrules 20A, 20B within sleeve 210 or after insertion of ferrules 20A, 20B within sleeve 210.

In another embodiment, the cores of fibers 42A, 42B are off-center with respect to the respective ferrules 20A, 20B (in which fibers 42A, 42B are housed) and ferrules 20A, 20B are also misaligned/mismatched with each other (due to the difference in diameters R1, R2). In this embodiment, one or both ferrules 20A, 20B may be reshaped by creating craters 372 (FIGS. 10B, 11) and micro-protuberances 370' on the respective outer surfaces 26A, 26B of ferrules 20A, 20B. In this way, the outer diameters of ferrules 20A, 20B are increased such that the offset of fibers 42A, 42B with respect to the centers of ferrules 20A, 20B is reduced. Also, the increase in diameters R1, R2 via craters 372 and micro-protuberances 370' reduce the offset between ferrule 20A and ferrule 20B within sleeve 210 as previously described.

Figure 14A:
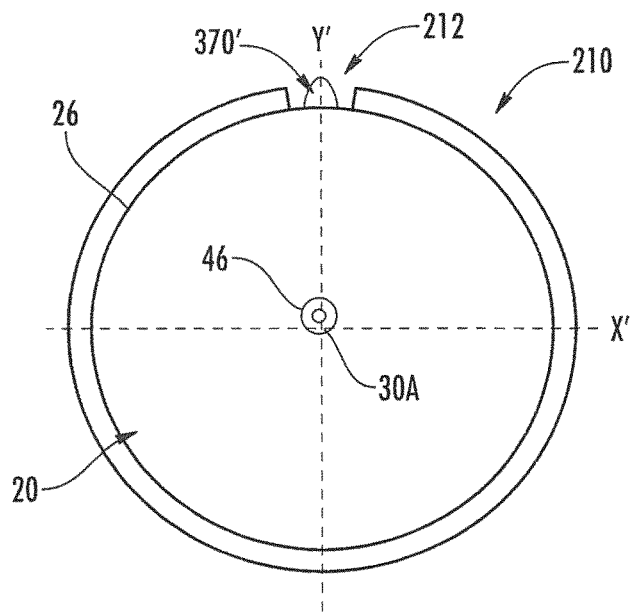
FIGS. 14A and 14B are front views of a ferrule with an optical fiber within a sleeve illustrating the effect of micro-protuberances on the alignment of a core of the optical fiber with a center of the sleeve.
Figure 14B:
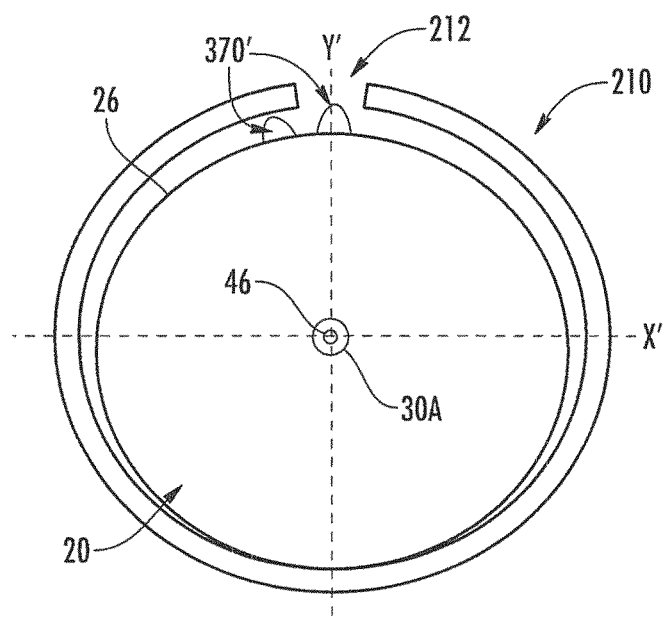

As shown in FIGS. 14A, 14B, micro-protuberances 370' can also bring the center of the fiber core 46 closer to alignment with a center 30A of sleeve 210 (i.e., reducing the eccentricity of fiber core 46 relative to the center 30A of sleeve 210) when ferrule 20 is received in sleeve 20. As shown in FIG. 14A, a first micro-protuberance 370' is positioned within slot 212 of sleeve 210, and fiber core 46 is misaligned with center 30A. To align fiber core 46 with center 30A, an additional micro-protuberance 370' is created along outer surface 26 and spaced apart from the first micro-protuberance 370' by a distance that is larger than the opening dimension of slot 212. The additional micro-protuberance 370' engages with sleeve 210 and repositions fiber core 46 relative to center 30A to offset the previous alignment difference between fiber core 46 and center 30A. It is contemplated that variations in micro-protuberance pattern along the outer surface 26 of ferrule 20 and/or polishing may also be used to alter the physical properties of (e.g., geometrical relationships between) the micro-protuberances 370', fiber core 46, ferrule 20, etc. (e.g., reducing the height of micro-protuberances 370' to bring the center of fiber core 46 closer to the true center 30A of sleeve 210).

In addition, micro-protuberances 370' can be positioned around outer surface 26 to increase the diameter of ferrule 20 and to simultaneously reduce or eliminate misalignment with fiber core 46 as discussed herein. That is, prior to altering outer surface 26 of ferrule 20 (i.e., via crater 372 and micro-protuberances 370), ferrule 20 may have a core to ferrule concentricity error or concentricity error E as discussed previously with respect to FIGS. 6A and 6B. Once the concentricity error E is measured, a "new" true center 30'' (FIG. 12) can be defined by reshaping outer surface 26 of ferrule 20 (i.e., via craters 372 and micro-protuberances 370') to reduce the concentricity error E. In another embodiment, micro-protuberances 370' can be positioned around outer surface 26 to increase the diameter of ferrule 20 to a predetermined value to reduce or eliminate misalignment with fiber core 46 as discussed herein.

In all of the aforementioned examples of selectively shaping outer surface 26 of ferrule 20, experiments can be performed to establish a database of empirical surface shaping data. The data can then be used to establish the rates of change of the surface shape for a given process based on the process parameters, e.g., abrasive roughness, pressure, amount of surface area being treated, laser intensity, time of exposure, wavelength, etc. The database can then be used to select the duration and process parameters to achieve the select surface reshaping required to substantially reduce the concentricity error E to a new concentricity error E'<E, including getting δ' as small as possible. The reshaped outer surface 26' of ferrule 20 can be re-measured to confirm that the new concentricity error E'<E. In examples where there is at least one of a circularity tolerance and a diameter tolerance, outer surface 26 can be measured after reshaping to ensure that one or both of these tolerances are met.

Figure 9A:
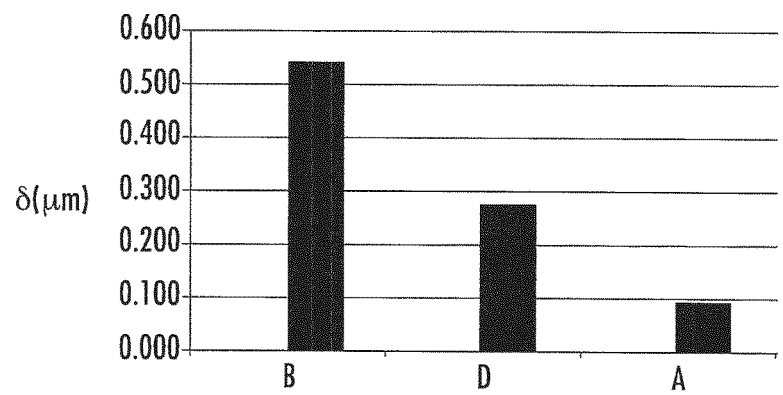
FIG. 9A is a column plot of the magnitude of the core-to-ferrule concentricity error δ for a "before material removal" state B, a "during material removal state" D, and an "after material removal state" A, measured at an axial location on the ferrule and showing how select removal of material of the outer surface of the ferrule can reduce the size of the core-to-ferrule concentricity error.

FIG. 9A is a column plot of the magnitude core-to-ferrule offset δ for before (B), during (D), and after (A) ferrule reshaping us the abrasive belt technique described above in connection with FIG. 8A. The measurements of core-to-ferrule concentricity for the "during material removal" phase D was after 15 material-removal steps, while for the "after material removal" phase A was after 25 material-removal steps. The bar for each measurement phase represent a measurement at an axial position along outer surface 26 of ferrule 20 and indicates the improvement in concentricity at the axial position.

Figure 9B:
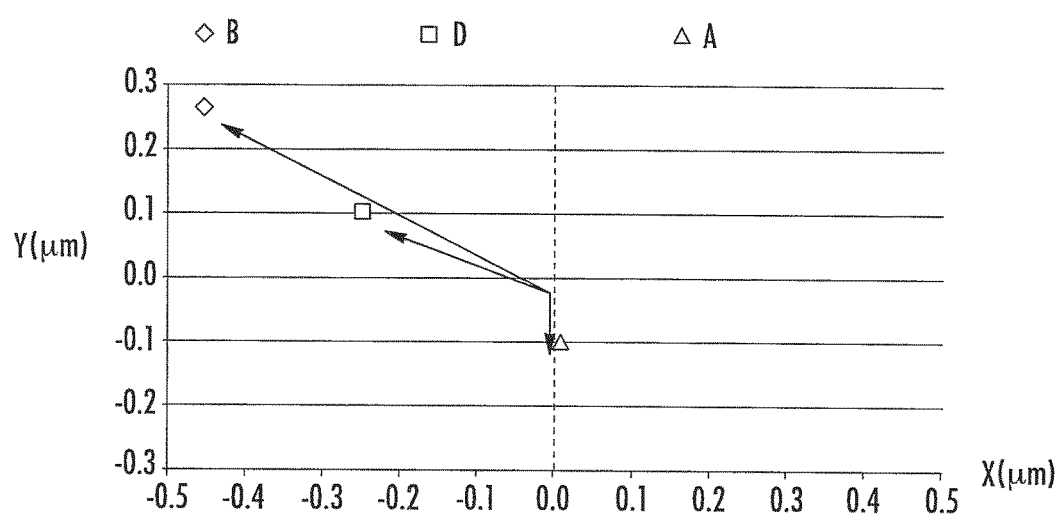
FIG. 9B is a x-y Cartesian plot (in microns) of the core-to-ferrule concentricity error E=(δ, θ) for the three aforementioned material-removal states B, D, and A, showing how the magnitude and direction of the core-to-ferrule concentricity error vector changes due to selective reshaping of the ferrule outer surface by material removal using an abrasive belt.

FIG. 9B plots the displacement vector (δ, θ) for the above-mentioned three material removal phases B, D, and A, illustrating how both the magnitude of the displacement δ as well as the displacement direction (angle) changed during the material removal process relative to the true center of the ferrule.

Figure 9C:
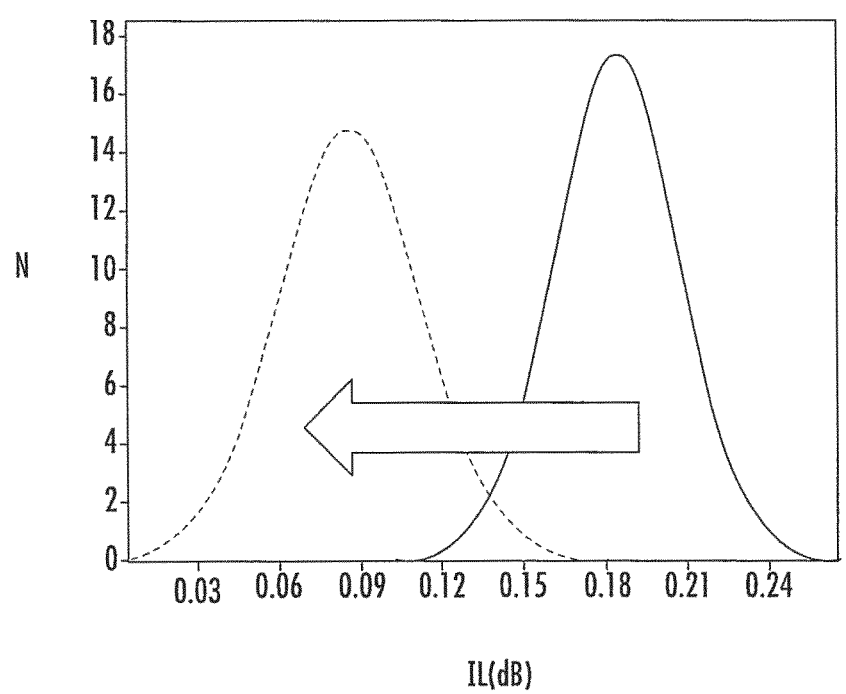
FIG. 9C is a plot of the insertion loss IL (dB) on the horizontal axis versus the number N of IL measurements made on a pair of connectors before and after ferrule reshaping (solid and dashed line, respectively), showing an overall reduction in the insertion loss due to the reshaped ferrule.

FIG. 9C is a plot of the insertion loss IL (dB) (horizontal axis) versus the number N of IL measurements (vertical axis) made on a pair of connectors before and after ferrule reshaping (solid and dashed line, respectively), showing an overall reduction in the insertion loss due to the reshaped ferrule.

Reshaping Method Considerations

As noted above, in some embodiments reshaping of ferrule 20 is subject to the constraint that the circularity and diameter must remain within select tolerances. However, ferrules 20 could be made to have a slightly larger diameter than normal in anticipation of being reshaped. For example, in some cases it may be easier to process outer surface 26 over all four quadrants Q1 through Q4, with the overall effect including a slight reduction in the overall ferrule diameter to ultimately result in the desired nominal diameter dF and a shape that complies with diameter and circularity tolerances.

In other embodiments, the diameter and/or circularity tolerances may be loosened or for all practical purposes eliminated if the reshaped surface 26' is beyond the usual circularity tolerances but still provides for a reduction in the concentricity error, which in turn may lead to a reduction in insertion loss. For example, a normal circularity tolerance for ferrules having a nominal diameter dF of 1.25 mm or 2.5 mm is 0.5 μm. Thus, in some embodiments, where ferrule 20 has a nominal diameter dF of 1.25 mm or 2.5 mm, the cross-sectional shape of ferrule 20 may have a circularity error greater than 0.5 μm, yet have a concentricity error E' whose magnitude δ' is small, such as less than 1.2 μm, less than 0.6 μm, or even less than 0.3 μm. The magnitude δ' of the concentricity error E' may even be greater than 1.0 in such embodiments.

More generally, the circularity error and concentricity error may be expressed in terms of the nominal diameter dF. A ferrule with poor circularity but good concentricity may be one where: a) the circularity error is greater than 0.04%, or perhaps even greater than 0.08% of the nominal diameter dF; and b) the concentricity error E' has a magnitude δ' less than 0.048%, or perhaps even less than 0.012% of the nominal diameter dF.

As alluded to above, outer surface 26 of ferrule 20 may be reshaped in all of the quadrants Q1, Q2, Q3, Q4 (FIG. 6A) or in less than all of the quadrants. Thus, depending on the particular embodiment, the circularity error of ferrule 20 may exceed normal circularity tolerances in only one of the quadrants, in only two of the quadrants in other embodiments, in only three of the quadrants, or in all of the quadrants.

The initial outer diameter (i.e., before ferrule reshaping), diameter tolerance, and circularity tolerance are not the only dimensional requirements that may be loosened or for all practical purposes eliminated as a result of reshaped outer surface 26' resulting in low concentricity error E'. The concentricity error of axial bore 28, i.e. the offset distance $D_b$ (FIG. 6D) of central axis AB from true center 30, may alternatively or additionally be loosened or eliminated. For example, for ferrules having a nominal diameter dF of 1.25 mm or 2.5 mm, the offset distance $D_b$ is normally less than 0.3 μm. Thus, in some embodiments where ferrule 20 has a nominal diameter dF of at least 1.25 mm (e.g., 1.25 mm or 2.5 mm), the offset distance $D_b$ may be greater than 0.3 μm, greater than 0.5 μm, or even greater than 1.0 μm. The ferrule reshaping process effectively "corrects" this source of concentricity error E so that the new (i.e., post-reshaping) concentricity error E' has a small magnitude δ', such as less than 1.2 μm, less than 0.6 μm, or even less than 0.3 μm.

Another example of a dimensional requirement that may be loosened or eliminated is the diameter of the axial bore 28. For example, most optical fibers used in telecommunication applications have a bare glass nominal diameter of 125 μm. In other words, the cladding that surrounds the core and defines an outer surface of the bare glass optical fiber has a nominal diameter of 125 μm. Ferrule bores are designed to closely receive such optical fibers to reduce the potential for offset between the optical fiber and the central axis AB (noted above as one of the primary sources of concentricity error E). In particular, ferrule bores normally have diameters less than 128 μm, with diameters closer to 125 μm (e.g., 125 μm) generally considered to be more ideal. With this in mind, in embodiments where optical fiber 42—or more specifically, bare fiber section 40—have a nominal diameter of 125 μm, axial bore 28 may have a diameter that is at least 128 μm, or perhaps even at least 130 μm. Although the large diameter of axial bore 28 increases the potential for concentricity error E, the ferrule reshaping process can effectively be used as a correction mechanism for this source of error, similar to the preceding paragraph.

As can be appreciated, any combination of the above-mentioned dimensional requirements may be relaxed or eliminated by the ferrule reshaping process. This, in turn, may result in new ferrule shapes or designs having one or more attributes normally considered to be unacceptable.

Additionally, as mentioned above, any reshaping approach or combination of reshaping approaches may be used. For example, some methods may include removing material from one portion of outer surface 26 while enlarging another portion of the outer surface (e.g., by way of forming protuberances 370 from localized expansion or by adding material). It is possible that a given reshaping process overshoots or undershoots a target surface profile. In this case it is possible to apply a different reshaping process to correct the surface profile to achieve a desired concentricity error E. For example, the laser irradiation process described above could create protuberances 370 that are too high. The protuberance heights could be reduced by abrasive polishing techniques. In another example, protuberances 370 can be formed in an area that experienced excessive material removal to bring the local surface profile back to the desired position.

Certain materials (e.g., Fe-doped glasses) have the useful property that protuberances 370 can be grown and then subsequently reduced in height through application of reduced laser power illumination, with or without applied compression force on the protuberances, such as described in the aforementioned U.S. Pat. No. 8,291,729. This feature could be used to enable oversized protuberances 370 to be reduced in height using the same laser processing equipment that was used to create them.

Also in an example, protuberances 370 can be distributed on outer surface 26 in a specific pattern that avoids some or all of the protuberances being located at the slot 202 (FIG. 7B) of alignment sleeve 210. For example, as mentioned above, the protuberances can be arranged along a certain axial length of ferrule 20 in a ring-shaped or spiral-shaped pattern, or in an arcuate or axial line.

Although protuberances 370 are described as being formed by laser system 350 in the example shown in FIG. 8F, in alternative embodiments one or more protuberances may be formed by adding new material to ferrule body 21. Other types of deformations may also be formed by adding new material to ferrule body 21. The new material may be the same as or different than the existing material of ferrule body 21. Additionally, the new material may be applied and coupled to outer surface 26 using any suitable technique. For example, the new material may be an adhesive or other material configured to bond to the existing material of ferrule body 21, and may be fused, printed, or otherwise deposited on outer surface 26.

The ferrule reshaping methods disclosed herein may offer a number of main advantages, which may include: 1) making use of ferrules that would otherwise need to be scrapped; 2) relaxed manufacturing tolerances; and 3) a reduction in the insertion loss, i.e., greater coupling efficiency. Additional advantages may be obtained when a ferrule has a multi-piece construction, like ferrule 20 in FIGS. 5C and 5D, in that the materials of the ferrule can be selected to facilitate the reshaping process and/or reduce the cost of the ferrule. For example, for ferrule 20 in FIGS. 5C and 5D, inner member 21A may be made from a ceramic or other material designed to meet durability requirements (e.g., ability to withstand a certain number of matings). Outer member 21B may be made from a cheaper material (e.g., a metal or polymer material) that can be more easily reshaped. As a result of such a construction and the reshaping process, ferrule 20 may be lower in cost than conventional ferrules yet have the same or better performance characteristics.

It will be apparent to those skilled in the art that various modifications to the preferred embodiments of the disclosure as described herein can be made without departing from the spirit or scope of the disclosure as defined in the appended claims. For example, part of the measurement of the concentricity error E is measuring the true center 30 of ferrule 20, as discussed above. And each of the re-shaping techniques involve changing the true center 30. The same principles may be applied with the aim of reducing the offset distance $D_b$ of the true center 30 from central axis AB of axial bore 28. Thus, an optical fiber may or may not be present in the axial bore.

Thus, the disclosure covers the modifications and variations provided they come within the scope of the appended claims and the equivalents thereto.

What is claimed is:

1. A method for reducing a core-to-ferrule concentricity error for a ferrule having an axial bore sized to operably support an optical fiber having a core, the method comprising:
    measuring a true center of the ferrule, wherein the true center is based on an outer surface of the ferrule; and
    reshaping at least a portion of the ferrule to change the true center of the ferrule, wherein the reshaping includes enlarging a portion of the ferrule;
        wherein the step of enlarging a portion of the ferrule includes forming one or more protuberances on the outer surface of the ferrule.

2. The method of claim 1, wherein the step of forming one or more protuberances on the outer surface of the ferrule comprises:
    creating, on the outer surface of the ferrule, a crater with at least one micro-protuberance on a side of the crater.

3. The method according to claim 2, wherein a depth of the crater is between 0.1 μm and 1000 μm and a height of the at least one micro-protuberance is between 0.02 μm and 100 μm.

4. The method according to claim 2, wherein creating the crater and the at least one micro-protuberance includes applying a laser beam to irradiate the outer surface of the ferrule, wherein the laser beam has a wavelength ranging between 10 nm and 20,000 nm and an average power delivered to the ferrule between 0.001 $\mu J/\mu m^2$ and 1000 μm $J/\mu m^2$, wherein the average power is based on a time period that is between 1 pico-second and 1 second.

5. The method according to claim 4, wherein the laser beam has a wavelength between 100 nm and 2000 nm and an average power delivered to the ferrule between 0.01 $\mu J/\mu m^2$ and 100 $\mu J/\mu m^2$, wherein the average power is based on a time period that is between 1 pico-second and 1 second.

6. The method according to claim 4, wherein the laser beam has a wavelength between 150 nm and 1000 nm and an average power delivered to the ferrule between 0.01 $\mu J/\mu m^2$ and 100 $\mu J/\mu m^2$, wherein the average power is based on a time period that is between 1 pico-second and 1 second.

7. The method according to claim 4, wherein the laser beam has a wavelength between 150 nm and 1000 nm and an average power delivered to the ferrule between 0.01 $\mu J/\mu m^2$ and 10 $\mu J/\mu m^2$, wherein the average power is based on a time period that is between 1 pico-second and 1 second.

8. The method according to claim 4, wherein the laser beam has a wavelength between 355 nm and 532 nm and an average power delivered to the ferrule between 0.1 $\mu J/\mu m^2$ and 10 $\mu J/\mu m^2$, wherein the average power is based on a time period that is between 1 pico-second and 1 second.

9. The method according to claim 2, further including mating a sleeve having a sleeve center onto the ferrule, wherein the at least one micro-protuberance engages with the sleeve thereby distributing a force of the sleeve when applied onto the ferrule.

10. The method according to claim 9, wherein the at least one micro-protuberance engages with the sleeve to reduce an eccentricity of the core relative to the sleeve center.

11. The method according to claim 10, wherein the step of reshaping includes removing material from the at least one micro-protuberance, wherein the step of removing material includes polishing the at least one micro-protuberance.

12. The method according to claim 2, wherein the at least one micro-protuberance includes a first micro-protuberance on one side of the crater and a second micro-protuberance on a second side of the crater;
    wherein a depth of the crater is between 0.1 μm and 1000 μm and heights of the first micro-protuberance and the second micro-protuberance are between 0.02 μm and 100 μm.

13. The method according to claim 12, wherein the first micro-protuberance and the second micro-protuberance are positioned opposite each other defining the crater therebetween.

14. The method according to claim 2, wherein the at least one micro-protuberance includes a cluster of micro-protuberances around the crater;
   wherein a depth of the crater is between 0.1 μm and 1000 μm and a maximum height of the cluster of micro-protuberances is between 0.02 μm and 100 μm.

15. The method according to claim 1, wherein enlarging a portion of the ferrule includes increasing a diameter of the ferrule to a predetermined value.

* * * * *

UNITED STATES PATENT AND TRADEMARK OFFICE
CERTIFICATE OF CORRECTION

PATENT NO. : 11,420,293 B2
APPLICATION NO. : 16/459041
DATED : August 23, 2022
INVENTOR(S) : Dana Craig Bookbinder et al.

Page 1 of 1

It is certified that error appears in the above-identified patent and that said Letters Patent is hereby corrected as shown below:

In the Claims

In Column 20, Lines 21-22, in Claim 4, delete "µm J/µm²," and insert -- µJ/µm², --.

Signed and Sealed this
First Day of November, 2022

Katherine Kelly Vidal
*Director of the United States Patent and Trademark Office*